United States Patent [19]

Modeen et al.

[11] 4,301,469
[45] Nov. 17, 1981

[54] RUN LENGTH ENCODER FOR COLOR RASTER SCANNER

[75] Inventors: Douglas P. Modeen, Granby; Frank D. Sundermeyer, Middletown, both of Conn.

[73] Assignee: United Technologies Corporation, Hartford, Conn.

[21] Appl. No.: 145,095

[22] Filed: Apr. 30, 1980

[51] Int. Cl.³ ............................................. H04N 9/10
[52] U.S. Cl. .................................................... 358/75
[58] Field of Search ................................. 358/75, 261

[56] References Cited

U.S. PATENT DOCUMENTS 4,206,475  6/1980  Taudt et al. ..................... 358/75 X Primary Examiner—Robert L. Richardson
Attorney, Agent, or Firm—Dominic J. Chiantera

[57] ABSTRACT

A run-length encoder circuit for use in compacting data samples from a multicolor cartographic source chart includes hardware filtering which counts the number of incoming identical color samples and rejects them as noise unless they exceed a programmable count; the actual count value being dependent simultaneously on the number of incoming color samples and also the particular type of color, either a line color or an area color which was recognized as valid.

2 Claims, 19 Drawing Figures

FIG. 4
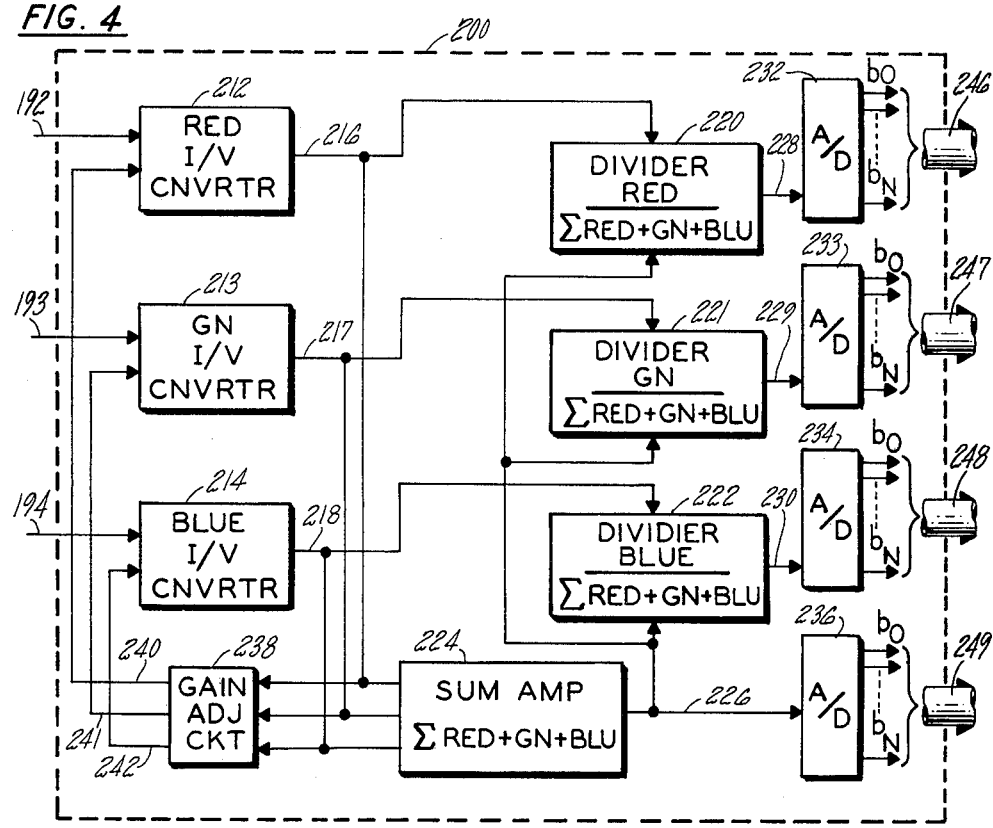
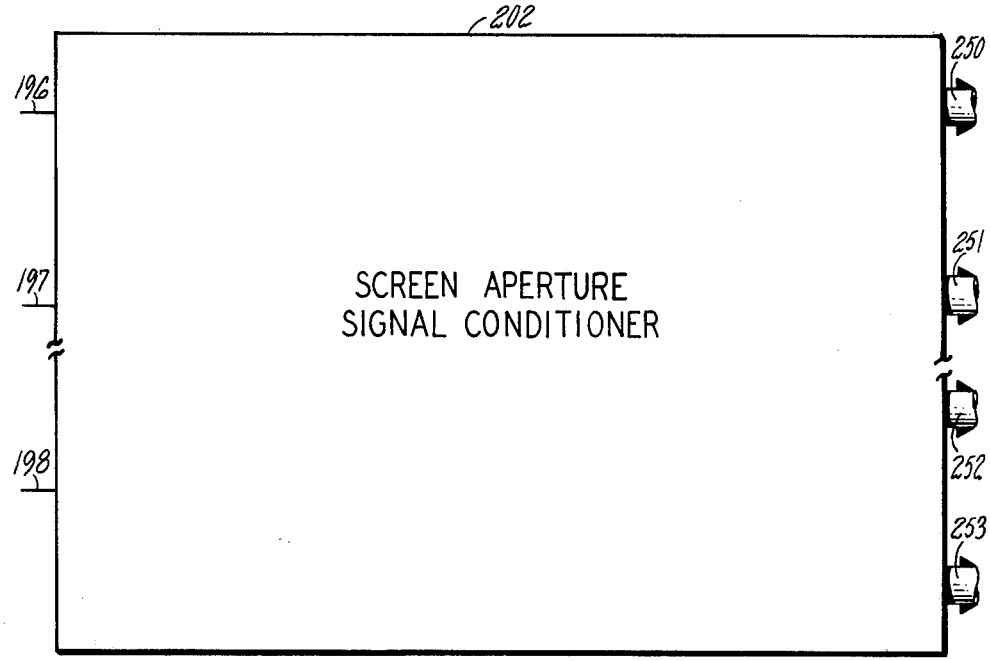
SCREEN APERTURE
SIGNAL CONDITIONER

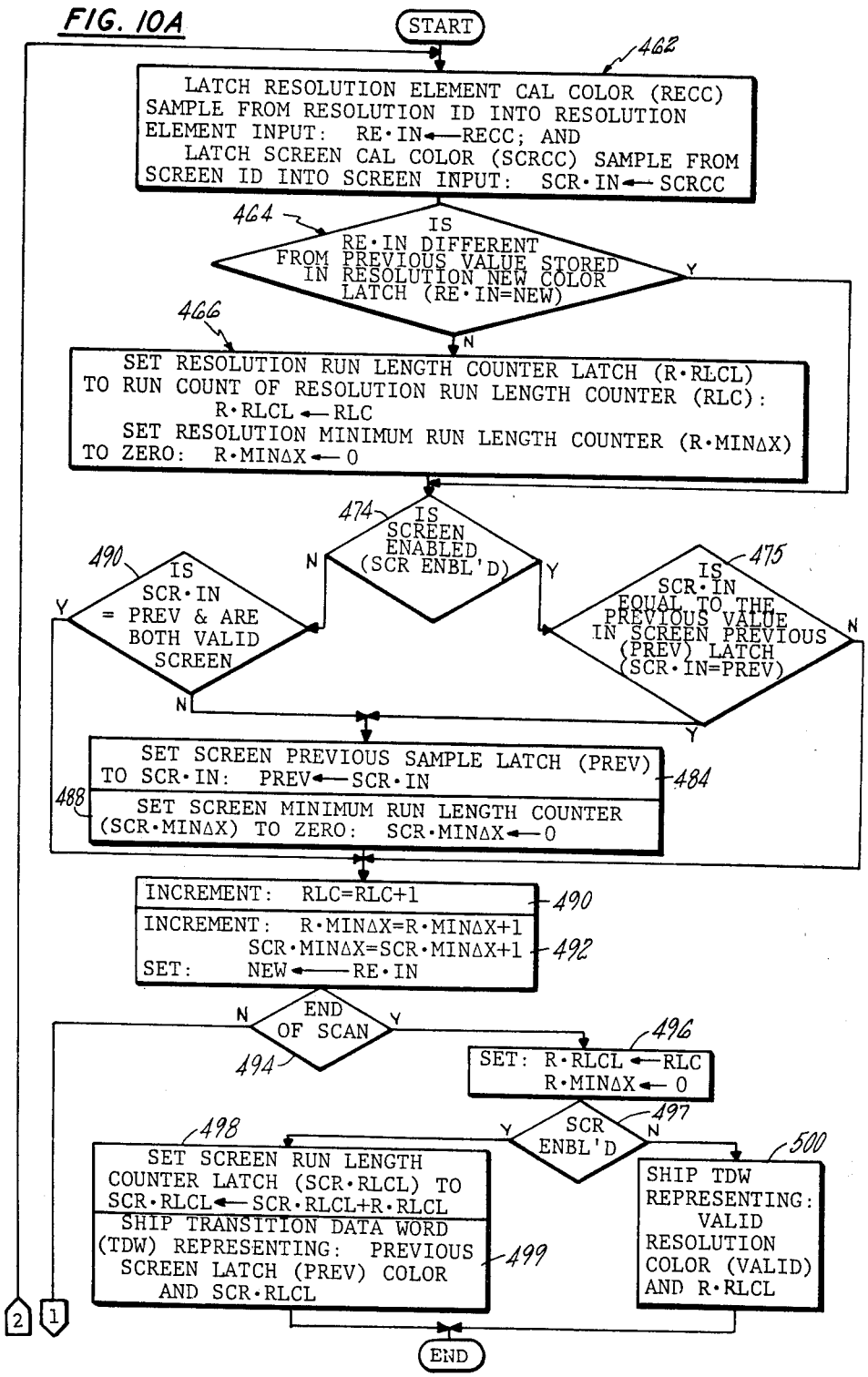

FIG. 13A

| N+ | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| RE·IN | W | W | W | W | W | W | W | W | W | R | R | W | W | W | W | W | W | R | R | R | R | R | R | R | W |
| SCR·IN | R | R | R | ↓ |   |   |   |   |   |   |   |   |   |   |   | R↑ | R | R | R | R | U | U | U | U | U |
| RE·MINΔX | 1 | 2 | 3 | 1 | 1 | 1 | 1 | 1 | 1 | 2 | 3 | 1 | 2 | 3 | 1 | 1 | 1 | 1 | 2 | 3 | 1 | 1 | 1 | 1 | 1 |
| RE-RLC | 1 | 2 | 3 | 4 | 5 | 6 | 7 | 8 | 9 | 10 | 3 | 4 | 5 | 3 | 4 | 5 | 6 | 7 | 8 | 3 | 4 | 5 | 6 | 7 | 8 |
| RE-RLCL | 0 | 0 | 0 | 4 | 5 | 6 | 7 | 8 | 8 | 8 | 0 | 3 | 3 | 0 | 4 | 5 | 6 | 6 | 6 | 0 | 4 | 5 | 6 | 7 | 7 |
| SCR-MINΔX | 1↓ |   |   |   |   |   |   |   |   |   |   |   |   |   | ↓ |   |   |   |   | 1↑ | 1 | 2 | 3 | 0 | 1 |
| SCR-RLCL | 0 |   |   |   |   |   |   |   |   | 0↑ | 8 | 8 | 8 | 11 |   |   |   | 11↑ | 17 |   |   |   |   |   |   |

→ SHIP 17 RED SCREENS

← RED SCREEN →   ← RED RESOL →

RUN LENGTH ENCODER FOR COLOR RASTER SCANNER

The Government has rights in this invention pursuant to Contract No. F30602-76-C-0205 awarded by the Rome Air Development Center (RADC) of the U.S. Air Force.

DESCRIPTION

1. Technical Field

This invention relates to visual image recording, and more particularly to the recording of multicolor cartographic data from a hard copy analog source.

2. Background Art

The process of cartographic reproduction, i.e. map reproduction, requires exacting tolerances for the faithful reproduction of visual character information from a master, or source chart. Faithful reproduction of character resolution is necessary to ensure the accuracy in depicting the placement and distances of the various topography features, to permit reliable calculation of distances, bearings etc. for accurate navigation. The Hydrographic/Topographic Center of the United States Government's Defense Mapping Agency (DMA) has the responsibility of providing to both Government and public agencies maps of both domestic and foreign countries. The foreign source material is derived from foreign counterparts of the DMA and varies greatly in the types of symbology including thickness of line defined boundaries and topographic legends and the methods of providing color deposition and color contrast.

The source cartographic data may be provided in various color combinations and may include an opaque base on which the visual characters are drawn, or in some cases a transparent base. The exacting resolution requirements, which are designed to ensure the detection of the leading and trailing edges of the various boundary lines (line thicknesses) force the reproducer to work with the smallest of resolution elements on the master chart. The ability to discriminate between colors in a multicolor master lithograph requires exacting color discrimination tolerances. The source chart colors distinguish, or denote changes, highlights, or hazards of the hydrographic/topographic surfaces. This may include various shades of a same base color in distinguishing surface topography or depth of water. In addition the use of different, but similar colors to distinguish national boundaries or navigational hazards requires the ability to discriminate between similar color tones. Finally, the processes used in depositing the color vary, and include even tone color, screen color, process color, or a mix of one or more on a single chart. The process color method creates a color from the combination of dots of a few primary colors, differing in dot size and screen angle; the resulting color visually sensed is the sum of the component dots. To obtain, instrumentally, the same color recognition the chart area from which the input signal is produced must be large enough to yield an equally distinctive result as that of the visual response. This of course is contrary to the requirement for the smallest resolution element to be scanned to satisfy the resolution accuracy requirements. Similarly with screen color the density of color is established by the dot size, i.e. the area covered by ink per unit of area on the chart. The recognition of process colors and screen colors impacts the optical system by the requirement for the relatively large area signal measurement, at the same time requiring the resolution-scale input measurement for even tone (solid) color graphic data which may also exist with screen method or process method color presentations.

The prior art cartographic reproduction methods include both a strictly manual process and also a manual digitizing technique, which are used to translate the visual information from the lithograph master into one or more lithographic plates; each representing one level of information from the chart, such as the black and white element information followed by one or more lithographic plates dedicated to reporting within the various boundaries. The prior art manual techniques are considered necessary due to the high accuracy requirements. The individual lithographic plates produced are then transformed through photographic etching techniques into press plates, each representative of the particular level of chart reproduction information. The strictly manual and manual digitizing techniques are both labor intensive and time consuming; in some instances the reproduction of a full size chart requiring almost a full man year.

In the manual digitizing methods, the apparatus used includes an objective lens with a fixed field stop; the objective lens being used with a source of illumination which is concentrated on the surface of the chart. The objective lens receives a portion of the illumination reflected back from the chart, and forms in the image plane of the lens the resolution area image which is limited in aperture size by the field stop setting. To satisfy the high resolution accuracy of the graphic characters, or symbology, a small field stop value is necessary; typical values used in cartographic digitizing are of a size necessary to provide a 0.025 to 0.1 millimeter aperture diameter (including objective lens magnification) in the image plane. The imaged information is then presented to spectral separation and filtering apparatus which detects the color of the imaged chart area, after which associated electronic equipment identifies the color of the image area from the spectral component measurements. The use of the flux field stop settings restricts the usefulness of the optical recording apparatus, and its universal applicability, limiting the equipment to specific types of cartographic materials.

Since the field stop is selected to produce resolution size images for detection of edge transitions in the graphic symbology at the required resolution accuracy, for the large area color screen printing the resulting digitized data of the smaller resolution size aperture is forced to record each color dot and the spaces between dots. This greatly increases the volume of output data stored, in addition to increasing processing time and computer capacity.

In a commonly owned, copending application entitled: COLOR RASTER SCANNER FOR RECORDING CARTOGRAPHIC DATA, U.S. Ser. No. 145,101, filed on even date herewith by R. G. Hubbard et al, a color raster scanner is disclosed which includes two apertures for sensing the reflected source chart image. These apertures include a small resolution size aperture for resolution imaging and a separate, larger screen aperture for large area imaging. The dual apertures provide dual, parallel channel optical sensed data which is processed by the scanner system for recording and storage; the system recording the screen aperture image in the presence of a sensed screen color image from the source chart and recording the resolution aperture image at all other times. The purpose of the dual aperture optics is to allow for the large area imaging for those types of cartographic source charts having screen color formatting over large area of the chart. The larger screen aperture integrates the color produced by the dot density of the screen as opposed to the smaller resolution aperture which provides a number of resolution size samples over each dot then transitions to the background color in between dots. Although data compacting, such as run length coding may be used to compact the samples into common color groups with the number of resolution elements associated with each successive color, the number of transitions across the large screen area results in an excess number of compacted data words, so as to in effect defeat the intent of the data compaction. Through the use of the large screen aperture disclosed by Hubbard et al the screen color is integrated in the large diameter aperture so as to provide a recognized screen color resulting from the particular dot density. This allows a fewer number of data words, each compacting the continuous screen color samples. Although the raster-type scan of the cartographic materials yields a data stream which is well suited to data compression, such as run-length coding, two problems arise for any type of run-length coding circuit which is used in this application. The first problem is that hardware noise filtering must be introduced without causing loss of definition of the resolution features provided by the resolution aperture. The second problem involves the screen color itself, since although the larger screen aperture integrates a screen area the large area itself may impinge on lines or other symbology having a common color with that of the screen but which must be sampled with the resolution aperture. Neither of these two problems associated with the compacting of cartographic sensed data are accommodated in the prior art run-length coding techniques.

DISCLOSURE OF INVENTION

One object of the present invention is to provide a run-length encoding circuit which converts two parallel streams of multicolor cartographic information provided from a small resolution size aperture and a larger screen aperture into a sequence of run-length coded digital words representing a single raster scan of the chart.

According to one aspect of the present invention, a run-length encoder circuit for use in compacting data samples from a multicolor cartographic source chart includes hardware filtering which counts the number of incoming identical color samples and rejects them as noise unless they exceed a programmable count; the actual count value being dependent simultaneously on the number of incoming color samples and also the particular type of color, either a line color or an area color which was recognized as valid. This allows the tailoring of the run length data compaction process to the particular features which exist on a given source chart. In further accord with the present invention, in a source chart which has screen color, the run-length encoding circuit receives both the resolution aperture and screen aperture samples; the encoder registering by count number the number of resolution aperture samples while simultaneously registering the screen color samples separately, the encoder counting the number of screen samples of the same color received successively and comparing this result with a programmable threshold count value which when exceeded registers only the screen color sample values for compacting into an output run-length encoded word. In further accord with this last aspect the run-length encoder circuit includes a screen disable function which allows the resolution aperture samples to disable the screen registering mode in response to resolution aperture samples which indicate valid resolution features, thereby preventing the loss of resolution information on features which are small and otherwise transparent to the larger screen aperture.

These and other objects, features and advantages of the present invention will become more apparent in light of the detailed description of a best mode embodiment thereof, as illustrated in the accompanying drawing.

BRIEF DESCRIPTION OF DRAWING(S)

FIG. 4 is a schematic illustration of one element of the system of FIG. 1;

BEST MODE FOR CARRYING OUT THE INVENTION

Figure 1:
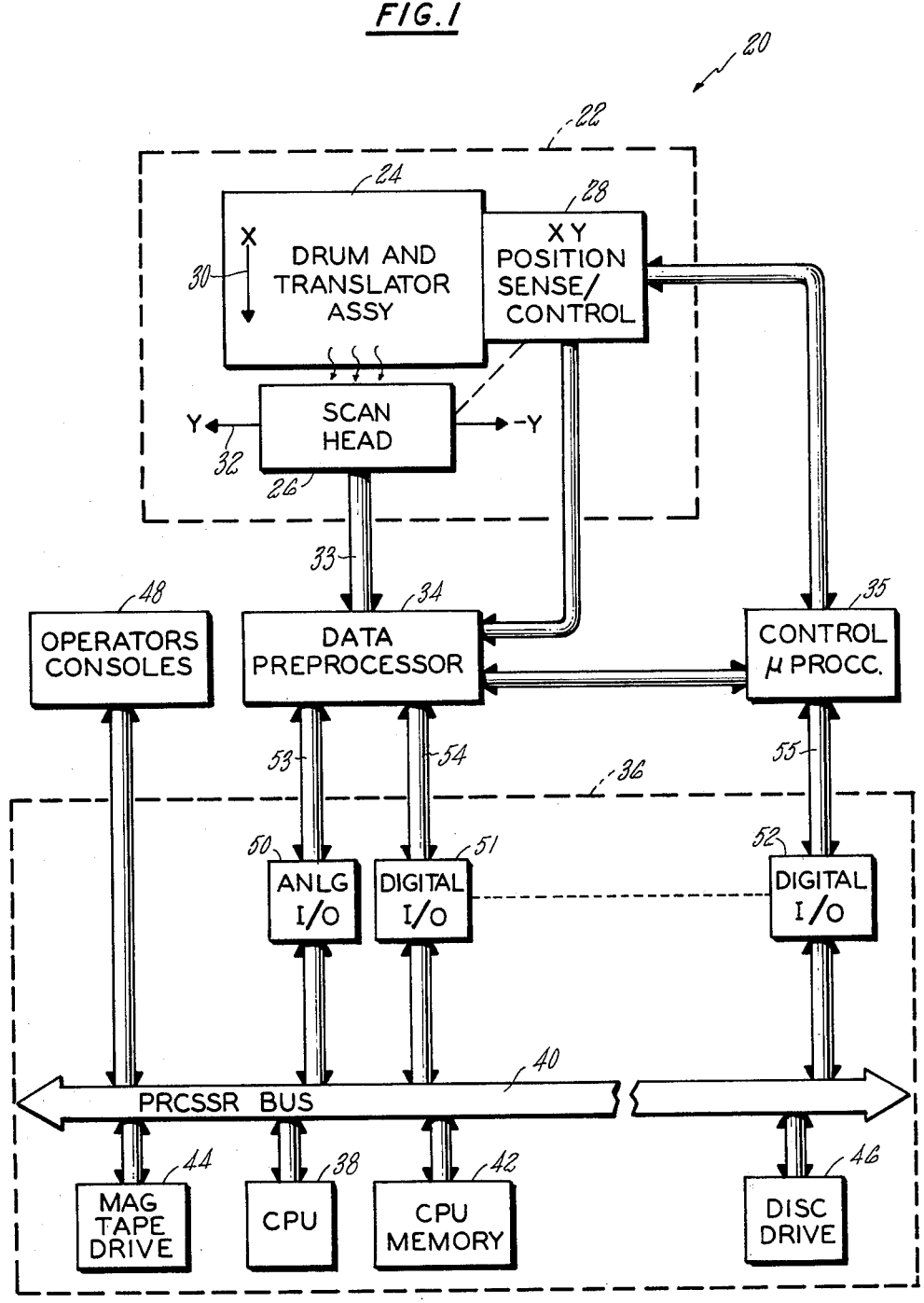
FIG. 1 is a system block diagram illustration of a color raster scanner according to the present invention.

Referring to FIG. 1, in a simplified system block diagram illustration a color raster scanner 20 includes a drum scanner unit 22 having a drum and translator assembly 24, a scan head assembly 26, and a raster (X, Y) position sense/control assembly 28. The drum and translator assembly includes the driving mechanism and control for rotating a drum on which the cartographic source chart is mounted. The drum rotation with respect to the scan head defines the X direction (scan line direction) 30. The scan head assembly which includes the system optics and photodetection circuitry travels along the axial length of the drum, as described in detail hereinafter; the actual position of the scan head along the drum axis defines the Y Cartesian axis 32. Typically the scan head moves from right to left along the drum axis. The position sense control 28 provides actual X and Y position information (sub-raster position) in addition to controlling actuation of the scan head motor drive.

The output signals from the scan head 26 are analog electrical signals representative of the reflected image from the drum mounted source chart. These signals are presented to a data preprocessor 34 whose functions include: detection of the color content of the scan head data, recognition of the presence of screen or process color, and the run-length encoding of this information into successive, multiple bit transition data words which are output by the preprocessor to the scanner signal processor 36. The preprocessor operates in two basic modes including a calibrate mode in which the source chart colors are inputted into the system, and a scan mode in which the actual raster information from the source chart is sensed and recorded.

The system may include a separate control microprocessor 35, which is used to perform the required control of the various scan head functions and position. The use of the control micro-processor allows the reduced overhead time for the signal processor 36. The micro-processor itself is of a type known in the art such as an Intel 8080, which includes both random access memory (RAM) and ultraviolet erasable programmable read only memory (EPROM). The microprocessor tasks include monitoring of the scan head X and Y position, controlling the stepper motor actuation for the scan head drive, monitoring the drum drive status, and directly controlling the setup and timing of the data processor, i.e. initiating data transfers from the data preprocessor to the system processor 36.

The system signal processor 36 functions as the color raster scanner data acquisition unit, and includes a central processing unit (CPU) 38 connected through input/output (I/O) lines to a processor data bus 40. The data bus functions as the interface between the CPU and: a CPU memory 42; peripheral devices including a magnetic tape drive 44, a disc memory drive 46, a keyboard/printer and graphic display terminal included in the operator's consoles 48; and the analog/digital I/O interfaces 50 through 52 which connect to the preprocessor and control micro-processor 35 through lines 53–55. The CPU is a known type, proprietary model general purpose computer, such as the Interdata Model 8/32, which is used in the system processor 36 with known peripheral and I/O interface modules. The CPU may be any one of a number of known types. The particular type CPU used is dependent on the overall scanner requirements alone, and itself forms no part of the present invention; the selection of the particular CPU being made by those skilled in the art based on the color raster scanner through-put requirements. If it is considered necessary, or practical, any one of a number of known processing systems and software packages may be used as may be obvious or readily apparent to those skilled in the art.

Figure 2:
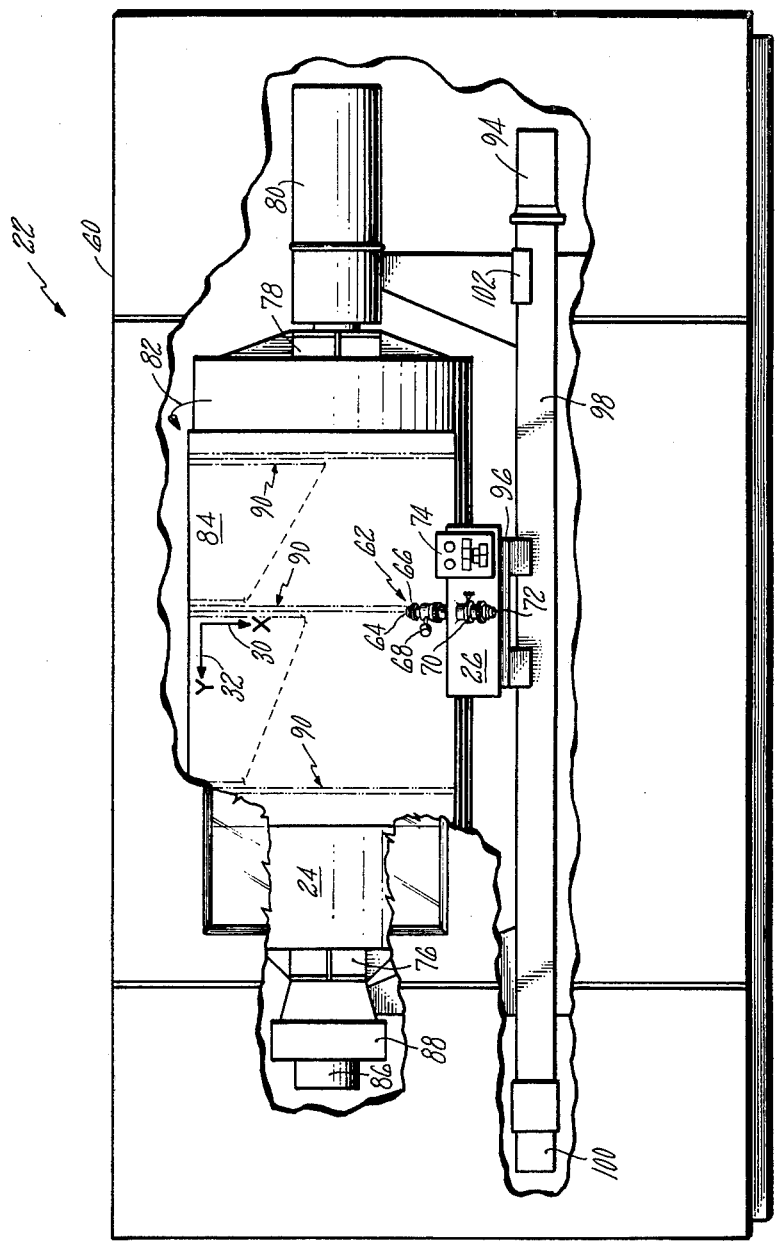
FIG. 2 is a perspective illustration, partially cut away, of one element of the system of FIG. 1.

Referring now to FIG. 2, in a partial cutaway, perspective illustration of the drum scanner unit 22 a cabinet 60 houses therein the drum structure 24 and scan head optics assembly 26. The scan head includes an adjustable objective lens assembly 62 having an objective lens 64, a lens adjustment screw 66, and an illuminator 68, described in more detail hereinafter. The scan head also includes a viewing scope 70 with an eyepiece 72 which is used by the operator to adjust the objective lens focus in its image plane. A scan head control panel 74 is also included on the assembly. The scan head contains the system optics and photo detection circuitry, and provides output analog electrical signals whose magnitudes represent the primary spectral elements of the image flux reflected from the surface of the source chart, as described hereinafter with respect to FIG. 3.

The drum 24 is a cylinder approximately 2,000 mm in circumference and 1350 mm long, with a nominal outside diameter of 640 mm. The drum rotates on precision bearings 76, 78, driven by a DC motor and tachometer assembly 80 at a controlled, nominal 300 RPM during the scan operation. In FIG. 2 the drum rotates in the direction of arrow 82, or upwardly with respect to the objective lens 64. The actual position of the objective lens with respect to the X axis 30 of the drum mounted source chart 84, is maintained by an 80,000 pulse per drum revolution shaft encoder 86 connected to the spindle 88 of the drum shaft. A once-per-revolution pulse from the encoder 86 establishes the absolute X origin for each of the scan lines 90 of the raster. The scan head position along the Y coordinate 32 is controlled by a stepper motor 94 which drives a translator carriage 96 and moves the scan head along the drum axis. The translator carriage travels along a pair of precision ways (not shown in FIG. 2) located within and along the length of the scan head drive assembly 98. The drive shaft is a lead screw assembly, i.e. a preloaded, ball-bearing, screw-nut assembly, with a typical ball screw lead of 5 mm and a pitch diameter of approximately 32 mm. The travel of the carriage in each complete turn of the lead screw (5 mm) is controlled by the stepper motor 94 in 400 steps. Each motor step corresponds to 0.9° of motor shaft rotation and to a linear travel increment of 0.0125 mm of the carriage (scan head) in the Y direction. A ball screw shaft encoder 100 provides an index pulse which together with a Y=0 position detector 102 defines the absolute Y axis origin at the right-hand position on the drum surface. The ball screw shaft encoder provides 4,000 counts per revolution ($\Delta Y$ of 5 mm) of the ball screw shaft, or for each 400 steps of the motor 94. This quantizes linear travel of the scan head to 0.00125 mm to allow accurate measurement of the rotation of the ball screw in response to the stepper motor drive pulses under variable load conditions.

The resolution element size, i.e. the $\Delta X$, $\Delta Y$ increments of the scan head in the raster, must be smaller than the size of the smallest anticipated chart symbol. A typical resolution element value is 0.025 mm. Position increments $\Delta X$ along each scan line are identified by the 80,000 pulses per drum revolution provided by the shaft encoder 86 which for a 2,000 mm drum circumference provide $\Delta X = 0.025$ mm interval definitions. These output pulses are counted and read by the control processor 35, FIG. 1 for position determination of the field of view of the objective lens 64 along the raster. As stated before, a once-per-revolution encoder reset ($X_O$) pulse establishes an absolute X origin. Position along the $\Delta Y$ axial direction is maintained by the micro-processor 35 which controls the input pulses to the stepper motor 94. The processor keeps a count of the total (counter-clockwise minus clockwise) pulses supplied to the stepper motor. This count is used for Y position determination and display. As stated, the ball screw shaft encoder provides a Y=0 position flag which with a Y=0 position sensor establishes the Y absolute origin. The 4,000 output pulses per revolution provided by the ball screw encoder are counted and read by the signal processor to verify the advance of the ball screw. The higher ΔY resolution increment allows for adjustment of the nominal ΔY=0.025 mm resolution element to account for variations in the ball screw travel due to manufacturing and assembly installation tolerances. The smaller 0.00125 mm interval indicated by the screw shaft encoder are not used in controlling the actual Y position of the scan head.

In the scanning operation, as the drum rotates at the controlled 300 RPM, the scan head 26 increments from Y=0 origin at the right-hand side to the left-most position along the ball screw drive shaft 98. The scan head is increment (ΔY) following each complete scan line on the source chart surface. The scan line length is equal to that of the source chart along the drum circumference, which is input through the panel 48 to the signal processor by the operator, so as to allow the scan head to increment by a ΔY interval prior to the appearance of the top of the chart on a subsequent revolution. The raster pattern is illustrated by the phantom scan lines 90 in FIG. 2.

The outputs from the scan head are analog electrical signal representations of the color content and symbology of the reflected image from the source chart, as received by the objective lens 64. These signal outputs are obtained from two separate apertures, including a smaller resolution aperture with a minimum diameter equal to the selected resolution element ΔX, ΔY lengths, and a larger screen aperture with a minimum diameter on the order of 40 times that of the resolution aperture. The reflected source chart image passes through each aperture and is separated into its primary spectral elements in the visible region, i.e. the blue, green, and red elements between 400 and 600 nanometer wavelengths. The resolution aperture spectral elements are at the resolution element scale to detect the smallest graphic symbology (lines, etc.) and the screen aperture elements are taken over larger areas of the source chart for the purpose of providing color identification of screen or process color presentations.

Figure 3:
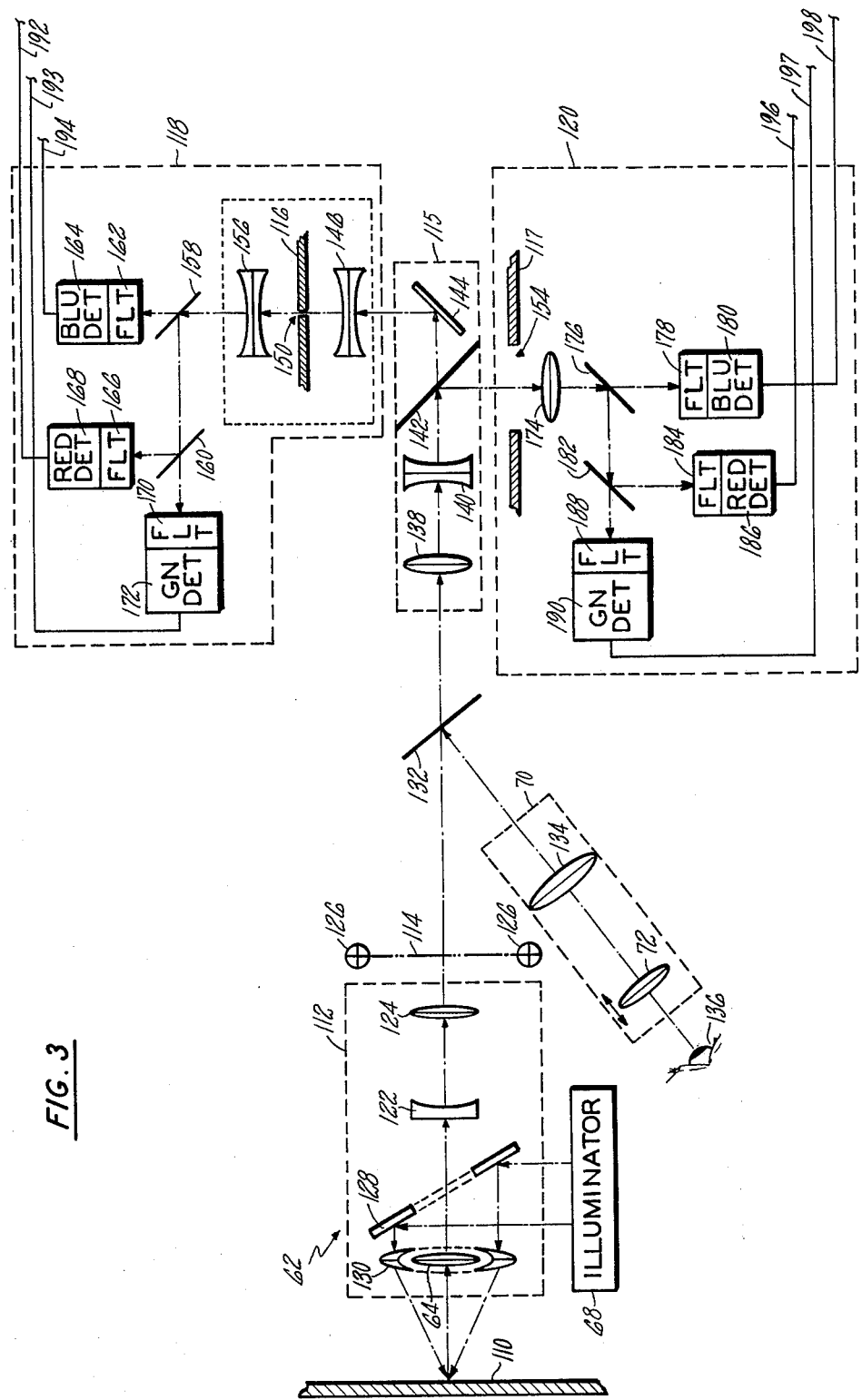
FIG. 3 is a simplified schematic diagram of the optics of the color raster scanner according to the present invention.

Referring now to FIG. 3, in a simplified schematic illustration of the scan head the reflected image from the source chart surface 110 is received by the scan head through a set of collection optics 112 which includes the objective lens 64 and which focuses the received images into an image plane 114. Relay optics 115 couples the image from the plane 114 into the measurement planes 116, 117 of the resolution aperture optics 118 and screen aperture optics 120. In addition to the objective lens the collection optics includes lenses 122, 124 and a focusing target 126 located in the image plane 114. The illuminator 68 (FIG. 2) directs light to the chart surface through a concentric, annular mirror 128 and an annular condensing lens 130 which surrounds the objective lens. The illuminator is typically a tungsten-halogen reflector lamp of a type known in the art, such as an ANSI Code EKE 150 watt, 21 VDC type lamp, and illuminates a chart surface area of approximately 0.6 cm.

The objective lens is mounted together with the imaging lens 122 in the assembly 62; each movable along the optic axis of the assembly with adjustment of the focusing ring (70, FIG. 2) to focus the reflected chart surface image in the plane 114. This adjustment allows for variations in chart thicknesses. The lens 122 is a plano-concave lens with a negative focal length on the order of −125 mm which through the focusing adjustment maintains the objective lens at a fixed working distance so that paraxial light rays reflected from the chart emerge parallel to the optical axis from the lens 122. Typically the objective lens is 6.5 X with a numerical aperture of 0.18, and the working distance between the objective lens and chart surface is on the order of 16 mm when adjusted to produce an image at 114. The lens 124 is an achromatic doublet (typical focal length of 50 mm) which minimizes chromatic aberration in the image plane. The image of the chart surface produced by the collection optics in the image plane 114 is real, inverted, and magnified on the order of 3 X.

A beam splitter (BS) 132 is located in the optical path between the image plane and the relay optics. The splitter is a pellicle, i.e. an elastic membrane of nitrocellulose with a thickness on the order of 8 micrometers. The pellicle is uncoated and provides a reflectance/transmittance ratio in the visible spectrum of 8/92, such that 92% of the collected image light rays are transmitted through the splitter to the relay optics and only 8% is reflected to the viewing scope 70. The scope includes a fixed position lens 134 which is focused on the target 126. By adjusting the eyepiece 72 the operator 136 first focuses on the targets 126 in the image plane. Next, the focus ring 66 of the objective lens assembly 62 is adjusted (adjusting both the objective lens 64 and lens 122) to focus the chart image onto the image plane. With the lens 124 fixed in position, the magnification and chart image position in the plane 114 is maintained essentially constant through the adjustment.

The relay optics includes in sequence along the optic path an achromatic doublet lens 138 with a focal length on the order of 60 mm which minimizes chromatic aberration in the coupled image, and a negative, bi-concave lens 140 with a focal length on the order of −500 mm to increase the back focal length of the lens 138. The image relayed from the lenses 138, 140 is coupled to the screen aperture 120 through beam splitter 142 and to the resolution aperture through a mirror 144. The splitter 142 is also a pellicle, similar to the splitter 132 with essentially the same reflectance/transmittance ratio, such that only 8% of the remaining 92% transmitted through the splitter 132 is reflected to the screen aperture optics 120. The remaining light (approximately 85% of the reflected chart image flux) is reflected at 90° by the mirror 144 to the resolution aperture optics 118. The mirror 114 is a front surface mirror having a thin opaque layer of aluminum overcoated with several transparent dielectric layers to enhance reflectance; average reflectance is 94% over the visible spectrum.

The light energy reflected by the mirror 144 is transmitted by a bi-concave lens 146 to the measurement plane 116 of the resolution optics. The lens 146 is a negative lens having a focal length on the order of −40 mm, so as to extend the back focal length of the relay optic lenses to ensure that the image will lie in the measurement plane. The resolution measurement plane includes the resolution aperture 150. The received image produced in the measurement plane is magnified on the order of 10X over the sample size at the source chart surface, but the aperture 150 restricts the image coupled into the resolution optics to the selected resolution element size. The light energy reflected by the splitter 142 is coupled directly into the screen measurement plane 117 which includes the screen aperture 154. The image produced in the screen aperture is magnified on the order of 5× from the sample size at the source chart surface.

The images in the measurement planes of the resolution and screen apertures are transmitted through lenses and spectral filters to photodetectors which provide the equivalent electrical analog signal of the primary spectral elements of the image. In the resolution optics a second negative, bi-concave lens 156, which is used to increase the divergence of the exiting light energy from the small resolution aperture so that it will cover a larger part of the light detecting surfaces of the photodetectors, couples the image from the measurement plane to a beam splitter 158. The splitter 158, positioned at 45° on the resolution optic axis, reflects part of the incident light to a second splitter 160 and transmits the remainder through a spectral filter 162 to the blue primary spectral element photodetector 164. The splitter 158 is a short wavelength transmitting dichroic filter with a cutoff wavelength (50% transmission) of 500 nanometers. The filter 162 is a short wavelength transmitting color filter with a cutoff at 520 nanometers. The filter cutoff sharpness is on the order of 7%; the transmission is 80% or more in the pass region and less than 4% in the background region.

The reflected light is received by the splitter 160 at a 45° angle of incidence. The splitter 160 is similarly a diochroic filter with a cutoff wavelength of 600 nanometers. Like the other splitters the cutoff sharpness is approximately 10%, with transmission on the order of 80% in the pass region and a maximum of 2% in the blocking region. The reflected light is coupled through the spectral filter 166 which has a cutoff at 600 nanometers, to the red photodetector 168. The remainder of the resolution image sample is transmitted through spectral filter 170 to the green photodetector 172. The filter 170 is a medium band-pass filter centered at 540 nanometers, the output of which is the green primary of the color measurement. The output from the filter 166 is the red primary of the color measurement.

In a similar manner the image at the measurement plane 117 of the screen aperture is coupled through a coated bi-convex lens 174 to a beam splitter 176, which is identical to the splitter 158 in the resolution optics. Since the aperture diameter of the screen is much larger than that of the resolution optics the lens 174 refracts the emergent ray bundle from the screen aperture 154 to reduce its divergence, so that the light image falls within the detection surface area of the three photodetectors. The splitter 176 transmits the major portion of the light energy from the lens through spectral filter 178 (identical to the filter 162) to the blue photodetector 180, and reflects the remaining energy to the beam splitter 182. Similarly the splitter 182, identical to the splitter 160, reflects a portion of its received energy through a red spectral filter 184 to the red photodetector 186 and transmits the remaining energy through a green spectral filter 188 to the green detector 190; the filters are identical to corresponding color filters in the resolution optics.

The photodetectors in the resolution and screen optics are identical, and of a type well known in the art such as the RCA Model 4526 Photomultiplier Tube. The detectors which are mounted within the scan head and energized from power sources within the system, provide output current signals at a magnitude proportional to the sensed light intensity. In the resolution optics the equivalent output electrical signals from the red, green, and blue detectors (168, 172, 164) are presented from the scan head to the data preprocessor 34 on output lines 192 through 194, included in the lines 33 (FIG. 1). The outputs from the red, green, and blue detectors (180, 186, 190) of the screen optics are presented to the preprocessor on output lines 196 through 198, also included in the lines 33.

In the preprocessor the current signals representative of the primary spectral elements of the light through the resolution and screen apertures, are presented to an associated one of two identical signal conditioners. The current signals are first converted to analog voltage signals whose magnitudes are proportional to the related spectral element magnitude. The magnitude of each signal is then compared to the sum magnitude of the spectral elements from a common aperture to provide red, green, and blue analog color ratio signals, and a "lightness" signal (the sum magnitude of red, green, blue) for both the resolution and screen apertures. The analog ratio signals and the lightness signal are then converted to their digital signal equivalent and presented from each conditioner in three spectral element channels and one lightness channel.

In FIG. 4, analog signal conditioners 200, 202 associated with the resolution and screen apertures respectively, receive the scan head output signals on lines 192–194 and 196–198. Only the signal conditioner 200 is shown in detail, since the screen signal conditioner 202 is identical. The signal conditioner 200 receives the current signals on lines 192–194 at one input of an associated one of three current-to-voltage (I/V) converters 212 through 214, of a type well known in the art, which provide a voltage output equivalent of the input current signal magnitude. Typically the current signal is converted to its voltage equivalent through a precision resistor; the voltage signal then being amplified through a high gain operational amplifier, such as the Analog Devices Model AD528K, which is strapped down in a closed loop configuration. Each of the converters include a closed loop gain adjustment to increase or decrease the gain through each converter individually to allow for a maximum output scale factor, i.e. to adjust for variation in background brightness levels from chart to chart.

The outputs of the converters are presented through lines 216 through 218 to the numerator input of an associated one of three divider networks 220 through 222 and to corresponding inputs of a common summing amplifier 224. The dividers are of a known type, such as the Analog Device Model 4295 signal divider. The amplifier 224 provides the analog signal sum magnitude of the three spectral elements ($\Sigma$ red+gn+blu) which is the lightness parameter, on an output line 226. The summing amplifier is similarly a high gain operational amplifier strapped down in a closed voltage gain loop. The lightness signal is presented to the denominator input of each of the dividers 220 through 222, each of which provide the respective analog ratio signal whose magnitude is equal to the ratio of the magnitudes of the associated spectral element voltage signal to the lightness signal. The ratio signals define the relative contribution of the associated color to the whole spectral color content, and are presented on lines 228–230 to the input of an associated one of the analog-to-digital (A/D) N bit converters 232–234. The lightness signal on the line 226 is also presented to the input of N bit A/D converter 236. The number (N) of bits for all of the A/Ds is equal, and is selectable in dependence on the desired resolution accuracy.

As stated before each of the I/V converters in each signal conditioner includes an adjustable closed loop again. This allows compensation for variations in reflected light intensity of the base, or background color between different source charts. The higher the amount of light absorption by the chart surface the lower the light intensity of the reflected image, resulting in a lower magnitude for the spectral element signals, with lower resolution and color discrimination accuracy. Since all of the channel output scale factors are fixed based on the number of output bits, it is desirable to use as much of the converter full scale output as possible. This is accomplished by providing a variable gain adjustment for each of the I/V converters, where the output of each converter is fed to related inputs of a gain adjust circuit 238. The gain adjust circuit compares the actual magnitude of the output signal provided by each converter in response to a known input signal magnitude, to a selected reference signal equivalent to a desired full scale output and provides on lines 240–242 gain adjustment signals to each of the associated converters. In FIG. 4 it is assumed that the actual gain adjust for each converter is provided automatically, such as by gain shaping networks in each converter. Alternatively, the actual gain adjustment for each converter may be provided through manual adjustment, i.e. a gain potentiometer, in response to a gain error signal provided for each converter from the associated gain adjust circuit. In either event, the purpose of the gain adjust circuits is to allow for the use of the full scale, or near full scale output capabilities of the converters in view of the variations in light absorption by the various source charts.

All of the optical data received by the scan head is processed through the signal conditioners. The outputs from the signal conditioners 200, 202 are provided on four channel outputs: three spectral element channels (red, green, and blue N bit ratio signals) on lines 246–248 and 250–252 respectively, and a fourth lightness channel on lines 249 and 253 respectively. As such, each aperture has four optical parameters which are used to define the color content of the raster scan data. In the operating scan mode, i.e. the actual chart recording, the signal conditioner four channel outputs for each aperture are presented to associated color identification circuits (FIG. 5), and during the color calibration process, i.e. the entry into the color raster scanner of the various colors present on a given source chart, the four channel output signals are presented to the system signal processor 36 (FIG. 1) which executes the color calibration process described in detail hereinafter with respect to FIGS. 7, 8.

Figure 5:
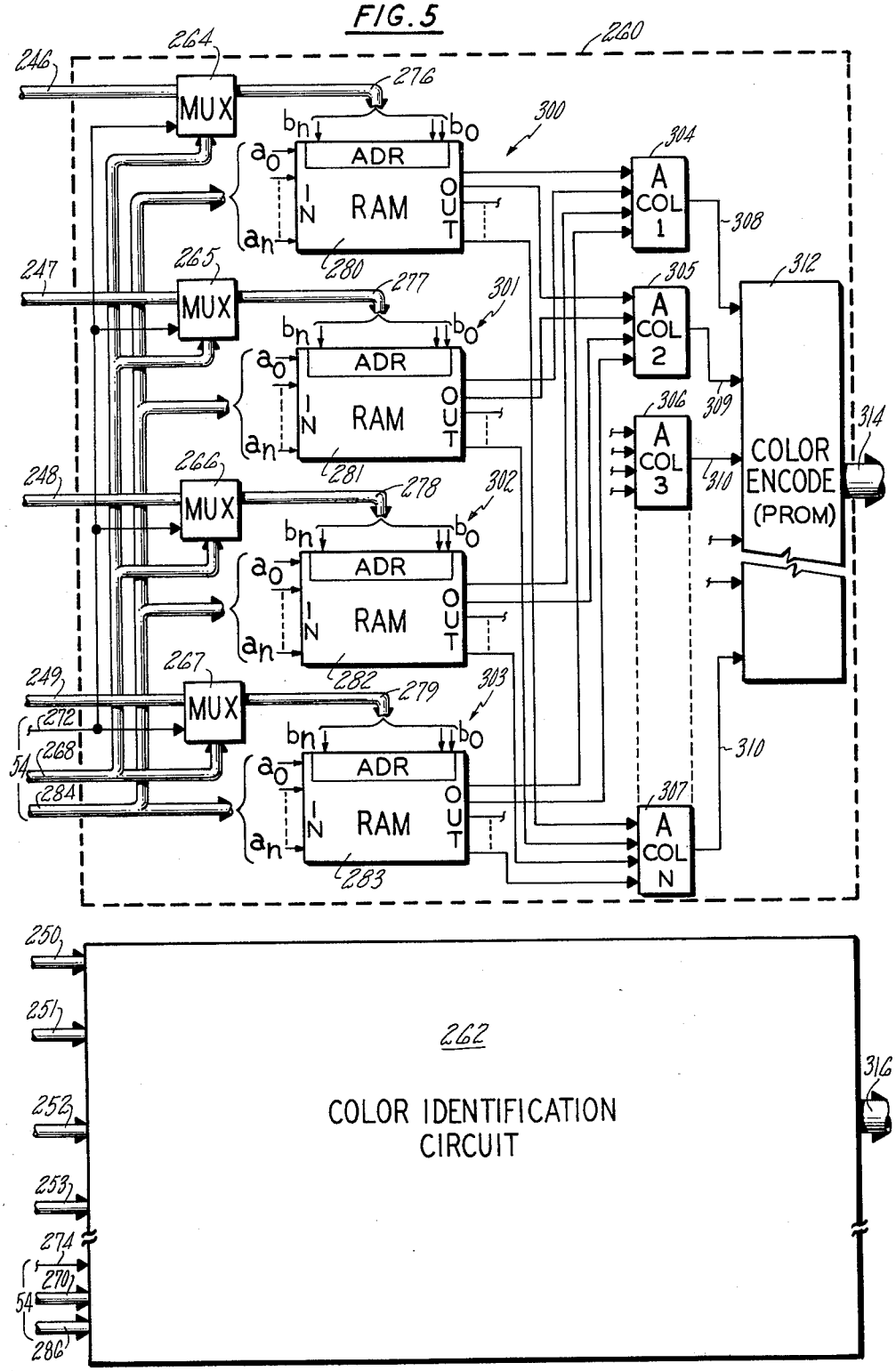
FIG. 5 is another schematic illustration of a color identification circuit for use in the system of FIG. 1, in accordance with the present invention.

Referring now to FIG. 5, the data preprocessor (34, FIG. 1) includes identical resolution aperture and screen aperture color identification (ID) circuits 260, 262; the ID circuit 260 receives the four channel output from the conditioner 200 on lines 246–249, and the circuit 262 receives the four channel output from the conditioner 202 on lines 250–253. Only ID circuit 260 is illustrated in detail since the two are identical. As shown, the ID circuit 260 includes four dual input multiplexers (MUXs) 264–267, each connected at one input to one of the four channel output lines 246–249 and each connected at the other input to an N bit signal line 268 from the system processor 36 (lines 270 for ID circuit 262); the lines 268, 270 included in the lines 54 from the digital I/O interface 51 (FIG. 1). Each MUX is addressed by a single bit address signal provided on a line 272 (274 for ID circuit 262) from the processor 26 which connects either set of input lines to N bits ($b_o - b_n$, where $n = N-1$) output lines 276–279, each connected to the address input of an associated one of four random access memories (RAMs) 280–283. The RAMs are equal size, $N \times I$ bits, where I represents the maximum number of different source chart colors to be identified, and each of the RAMs may comprise a number of parallel RAMs to provide the required memory size.

The data input port (IN) of each RAM, which in FIG. 5 are illustrated as N bit inputs such that the RAMs are $N \times N$ bit size, are connected through lines 284 (286 for the color ID circuit 262) to the signal processor. The color RAMs function as lookup tables which provide the tentative identification of the scanned data color content based on the ratio magnitude of the associated spectral element or lightness channel output signals. The lookup table data is loaded by the CPU 38 which addresses the RAMs to the lines 268 (270). The CPU then addresses each of the RAMs 280–283 to load the RAMs through lines 284 (286) with color identification data representative of the calibrated color information obtained from the source chart during the calibration process described in detail hereinafter. Each of the N output data bits (OUT) represent a different one of an N number of colors.

The color calibration process is described in detail hereinafter, however, a brief explanation of the calibration process is necessary to teach the operation of the color ID circuits. Briefly, each of the colors resident on a given source chart are scanned individually by the scan head under operator control. This is provided by the operator selecting areas on the source chart surface which contain one of the chart colors, each area being defined by its X, Y coordinates to the scan head. The operator selects the number of data points (resolution element images) to be recorded. The sensed data is separated into its spectral contents by the signal conditioners and presented to the signal processor 36 for storage. The CPU establishes histograms for each set of data points associated with the spectral elements of each chart color. Variations in color density and quality, and the methods of depositing the color on the chart surface, result in variations in the data values of the same element. The histogram, which is a graphic representation of the frequency of occurrence of a common event (the number of times that the same data signal magnitude occurs) result in a peak value with trailing density values at either end; the width of the histogram distribution and the limits of the distribution being defined by a range of RAM decimal address values. The processor inserts logic ones at each RAM address value at which a data point appears. These ranges of RAM address values associated with each color spectral element are then loaded by the CPU into the respective RAMs by addressing the MUXs and loading in the data through the lines 284 (286) to the data inputs of each.

Figure 6:
FIG. 6 is an illustrative tabulation used in the description of the schematic of FIG. 5.

FIG. 6 typifies the calibration data content loaded in an $8 \times N$ bit RAM. The 8 bit address 290 has 256 states (0 through 255), each representing a different magnitude of the related channel signal. Each decimal address value identifies an N bit output word 292, each of the N bits (294–299) defining the spectral parameter of a different color in dependence on the data loaded into the RAM during the calibration process; from color No. 1 through color No. N. Each color number spectral element is defined by a range of channel signal magnitudes corresponding to a range of RAM address decimal values. For color No. 1 (output bit 294) the range extends from decimal 24 through decimal 51; color No. 2 extends over a range of less than 50 to more than 54, and so on through the Table.

As shown in FIG. 6, with the exception of color No. 5 (output bit 298) the range of address values for each spectral element overlaps by different amounts, such that more than one color element may be defined at each RAM address value; the colors whose elements overlap at a common address value being potential "interfering" colors. Since each RAM content represents only one spectral parameter for each of the colors the colors are not truly interfering unless they occupy common address values in each of the four RAMs, i.e. a common spectral parameter value in each of the four channel outputs from the signal conditioners. In general interference between two or more colors in one or more of the color RAMs is common, such that the final identification of a unique color output is provided by the decoding portion of the color ID circuits as described hereinafter.

In operation, the address of the ID RAMs by the channel input signals from the conditioners defines the RAMs output data words provided on lines 300-303, each containing the N bits illustrated in FIG. 6. Each signal bit in each output is presented to one of an N number of AND gates 304-307. Each common bit number output, i.e. all bits No. 0, all bits No. 1 etc., are presented to a common AND gate; all 0 bit outputs from each RAM being presented to AND gate 304, all bit No. 1 outputs to the AND 305 and so on. Since there are only four color RAMs each AND gate has four inputs. The AND gate outputs are provided through lines 308-311 to associated inputs of a color encode circuit 312. The color encode may be a lookup table, such as a programmable read only memory (PROM) which decodes the color information provided from the AND gates to its address input. Normally only one AND gate at a time provides a logic one discrete to the encode circuit. Although one or more spectral elements may overlap in a particular one of the four channel RAMs, the spectral elements of two or more colors must overlap in all four of the RAMs before a second AND gate can output a logic one. Depending on which input line the logic one appears (address value) the color encode reads out the color number or state stored at that address. In the event that there is a true interference between two or more colors such that there is more than one AND gate output logic one, the color encode provides an uncalibrated (UNCAL) output signal indicating that a unique color number cannot be defined. Similarly in the event that there are no output signals from any of the AND gates te encode again provides the UNCAL signal manifestation. The output signals from the color encodes in ID circuits 260 and 262 are provided on output lines 314, 316 respectively. The number of bits in the output signal depends on the maximum number of calibrated colors and color state descriptions defined for the system; for a system having a seven calibrated color requirement plus the UNCAL state the encode output would have three bits.

Figure 7:
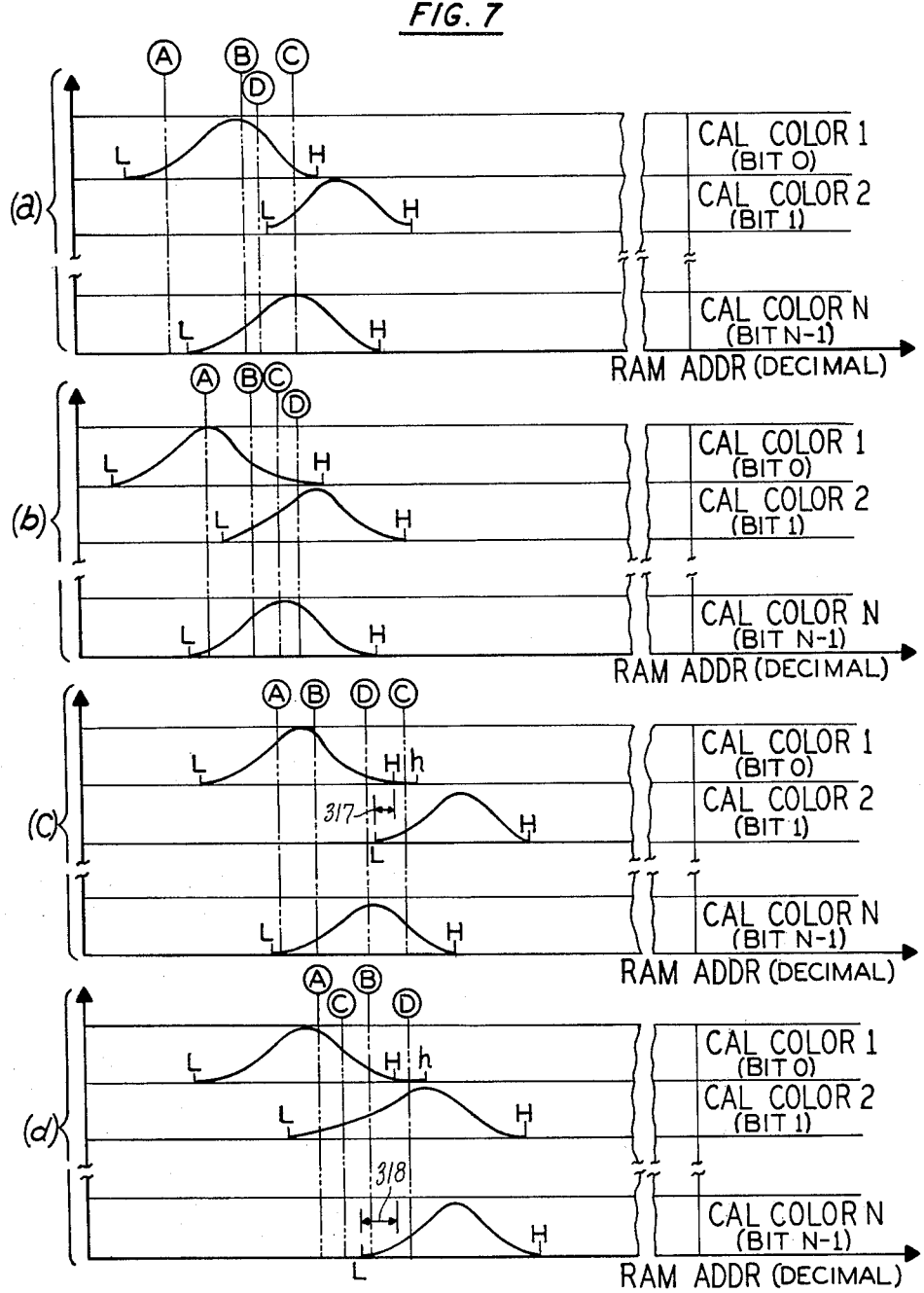
FIG. 7 is an illustration of waveforms used in the description of a color calibration process for use in the system of FIG. 1 in accordance with the present invention.

Referring now to FIG. 7, the waveforms in illustrations (a) through (d) represent the histogram distributions of each of the four spectral parameters obtained during color calibration of the colors 1, 2 . . . N, i.e. CALIBRATED COLORS to be stored in each of the RAMs (280-283, FIG. 5) in the table format typified in FIG. 6. The histograms are provided by the CPU to establish initial high (H) and low (L) limits for each, and to permit color enhancement, i.e. higher discrimination between interfering colors, so as to reduce the occurrence of the uncalibrated state (% UNCAL). The illustrated histograms are obtained by plotting the number of times a particular spectral element value occurs versus the particular value; in FIG. 7 the abscissa represents the decimal range of values of the N bit channel signals which provide the RAM addresses. The range of address values equals the width of the distribution. In illustrations (a) through (d) the histograms are not intended to illustrate any accurate scale, but are provided for teaching purposes only.

In FIG. 7, the initial high (H) and low (L) limits are established by the CPU following the CALIBRATED (CAL) color data acquisition and prior to loading the data into the RAMs. The limits do not necessarily correspond with the actual high and actual low values obtained for the particular spectral element. In order to eliminate "wild" data points resulting from extraneous noise or other interference the conditioned high and low limit values are established by truncating the data end points (both high end and low end) to a selected percentage value of the maximum distribution value (maximum number of samples of the distribution).

Following the setting of the limits the CPU compares the ranges of the data points to each other to determine the CAL COLOR discrimination accuracy. The results of the comparison are printed out in a summary which is typified by the format of Table I,

TABLE I

| COLOR CALIBRATION SUMMARY | | | | | | |
|---|---|---|---|---|---|---|
| Color No. | No. Points | % UNCAL | % Color | | | |
| | | | No. 1 | No. 2 | . . . . . . | No. N |
| 1 | 250 | 5.6 | 92.3 | 0.4 | | 1.7 |
| 2 | 500 | 2.8 | 0 | 96 | | 1.2 |
| . | . | . | . | . | | . |
| . | . | . | . | . | | . |
| . | . | . | . | . | | . |
| N | 410 | 6.8 | 2.4 | 0.3 | | 90.5 | which lists in the first column the CAL COLOR number defined by the operator, and in the second column the total number of data points obtained for each color during the calibration sampling process. The third column lists the percentage of uncalibrated (% UNCAL) data points for each color number, i.e. the data points for that color number which are common with at least one other color in all four spectral parameters such that the color encode (312, FIG. 5) cannot define a unique color number. The remaining columns list the percentage of each CAL COLOR's total data points which uniquely define their "parent" and the percentage of actual data points of the particular CAL COLOR number which were common with some other "interfering" color, but due to truncation of the parent color data during limit setting the data points fall only within the range of the interfering color. In other words the data lost its identity with its parent color and was captured by the interfering color.

The data points of one CAL COLOR which are captured by an interfering color may not be retrieved by the parent for any set of calibration data. The capturing occurred as a result of the reduction of the parent color limits, thereby eliminating an UNCAL condition (overlap with the interfering color) and resulting in the unique definition of the data point in association with the interfering color. Reestablishing the parent data points limits only results in another UNCAL point. It is less desirable to have UNCAL data points which represent, in the worst case, "holes" in the source chart data. The Table I identification of interfering colors indicates to the operator those colors which are closest to each parent CAL COLOR and, therefore, those colors most probably contributing to the percentage of UNCAL points for the parent. This allows for further adjustment of the limits of one of the spectral parameters of the interfering color causing the interfering color to retreat from the overlap region and reducing the overlap and the percentage of UNCAL points. This is performed in the calibration enhancement, or correction process described in detail hereinafter with respect to FIG. 8.

To illustrate the various Table I conditions in FIG. 7, the phantom lines A through D represent four CAL COLOR No. 1 data points, as they appear in each of the four spectral parameter regions of color No. 1. Since the four spectral elements have different magnitudes, each of the phantom lines associated with the same data point appear at different locations in each of the four parameter histograms of illustrations (a) through (d). As shown, data point A uniquely defines color No. 1 in (a) as opposed to colors 2, N. In (b) and (c) it overlaps with the color N spectrum, and in (d) it overlaps with color No. 2. The color discrimination circuitry outputs a unique color No. 1 indication since the A data point does not overlap with another color in each of the four parameters. As a result the A data point contributes to the percent value of No. 1 color in Table I. Data point B overlaps with the data points for color N in each of the four spectral elements resulting in an UNCAL indication and contributing to the % UNCAL value of Table I. Data point C illustrates a color No. 1 data point which is "captured" by interfering color No. 2. Data point C overlaps with both color No. 1 and color No. 2 in each of the three spectral parameters (a), (b) and (d), but does not overlap both in (c). The overlap in the (c) results from the trimming back of the color No. 1 limits from the highest sensed value (h) to the high limit (H) established by the processor. As a result data point C falls only within color No. 2 in all four parameters. As a result data point C is identified with color No. 2 and contributes to the interfering color indication of color No. 2 with color No. 1 in Table I. In the same manner data point D represents a color No. 1 value which due to the adjustment of limits of parameters (d) is captured by color N.

The process of correcting the CAL COLOR data is illustrated in the flowchart format of FIG. 8, and is performed to reduce the percentage of uncalibrated data points for each color. The summary of Table I allows the operator to select any one or all of the CAL COLORS for correction. As shown in Table I for CAL COLOR No. 1 both CAL COLORS No. 2 and N are interfering colors. The correction process is then directed towards each of the interfering colors 2, N in sequence. First one, then the other; the reduction in the % UNCAL for CAL COLOR No. 1 and the percentage loss in the interfering color being observed for each "correction". Each correction involves the further truncation of the overlapping interfering color parameter limit (H or L) in incremental values. Since the histogram illustrations (FIG. 7) show a continual increase in the number of data points from a minimum value at the limits to a peak value somewhere in the middle each correction reduces both the range and density of the interfering color spectral element which produces a percentage loss, or attenuation in the interfering color. As such the amount of correction involves a balance, between the competing considerations of reducing the % UNCAL for the parent color (color No. 1) while limiting attenuation of the interfering color to an acceptable level.

To minimize the conflict, the correction process selects the particular one of the four spectral elements of the interfering color in which elimination of the overlap produces the minimum attenuation. This may typically be associated with the minimum overlap, however, in those situations where the interfering histogram is "skewed" toward the interfering limit, truncation of even small overlap may produce an inordinate attenuation. In the simplified illustrations of FIG. 7 it is assumed that the minimum percentage loss is associated with the minimum overlap. To illustrate, in FIG. 7 the minimum overlap of color No. 1 with color No. 2 occurs in the spectral parameter of illustration (c), as shown by the overlap Delta value 317. The minimum overlap of color N with color No. 1 occurs in illustration (d) by the Delta value 318. As shown, the overlap of color N is greater than that of color 2, which is also evident from Table I by the higher percentage (1.7) of data points captured by color N than that percentage (0.4) captured by color No. 2.

Figure 8A:
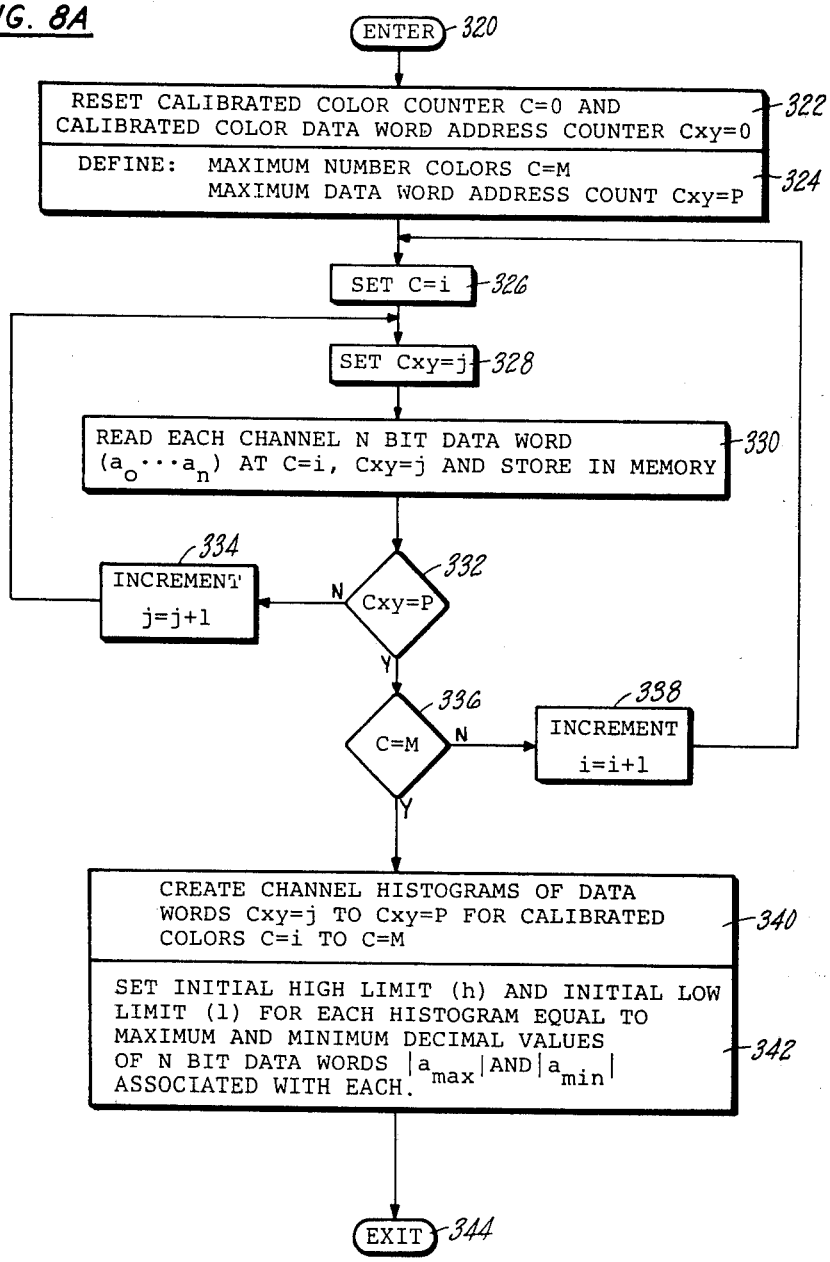
FIG. 8 (comprised of 8A-8E) is a simplified flowchart diagram illustration of the color calibration process for use in the system of FIG. 1, in accordance with the present invention.
Figure 8B:
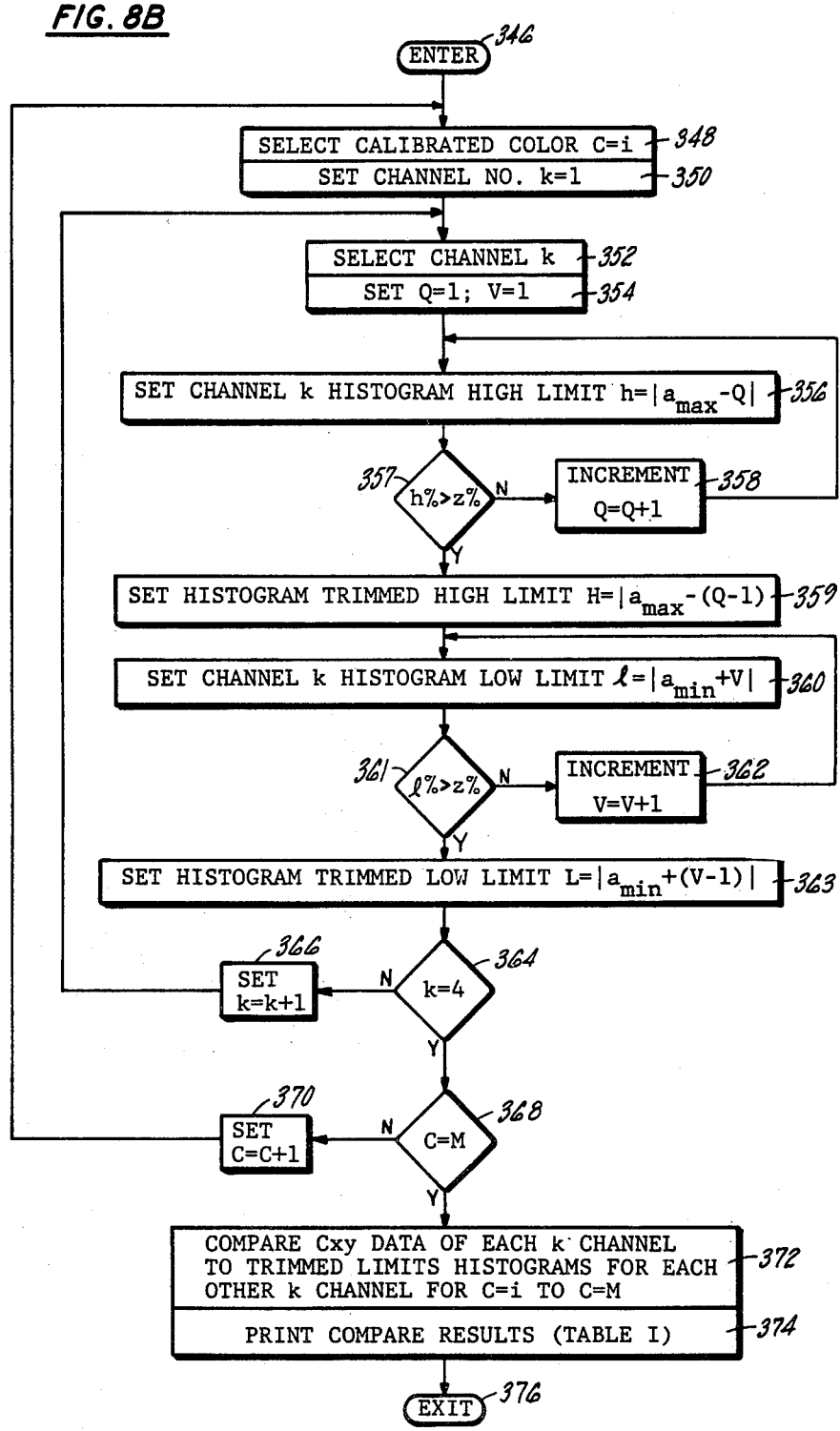

Referring now to FIG. 8A, the color calibration process begins with the data acquisition of the source chart colors, as defined by operator selection of certain areas on the chart. The coordinates of each of the selected areas are input to the system by the operator, and the CPU (FIG. 1) begins the data acquisition routine illustrated in FIG. 8A. The CPU enters at 320 and executes instructions 322 to reset the color counter (C) and data word address counter ($C_{xy}$). Instructions 324 request definition of the maximum number (M) of calibrated colors and the maximum (P) number of data points to be obtained.

Instructions 326, 328 set in the first color and define the first data point. Instructions 330 request the CPU to read the four channel N bit data words representative of the spectral parameters for each $C_{xy}$ data point and to store the results in the CPU memory. Instructions 332 determine whether or not the last data point (P) was entered for that color; if NO instructions 334 increment to the next data point value; if YES instructions 336 decide if this is the last (M) color. If NO then instructions 338 increment the color counter to set up the data entry for the next CAL COLOR.

Following data acquisition (a YES to instructions 336) the CPU executes subroutine 340 to create the individual spectral parameter histograms for each of the CAL COLORS recorded. Instructions 342 establish "initial" high (h) and low (l) limits for each histogram equal to the actual maximum and minimum decimal values of the N bit data words from the channels, after which the CPU exits the routine at 344.

The initial data limits establish a starting point for the setting of the final limits. As stated before the final high (H) and low (L) limits are obtained by trimming back from the actual maximum and minimum values obtained, i.e. truncating the individual histogram range of decimal values to eliminate the "wild", extraneous data point values. This is provided in the routine of FIG. 8B, in which the CPU enters at 346. Instructions 348, 350, 352 select the first CAL COLOR (C=i), set the channel counter (k) to 1, and select the first channel. Instructions 354 set the high and low limit increment counters (Q, V) to the first increment, after which the CPU begins the iterative process of successively trimming back on each initial limit by successive single digit decimal values of the N bit abscissa (FIG. 7). This occurs first with the high limit in instructions 356–359 where: the initial limit value is trimmed (356), compared to a selected reference percent loss (that percentage of the total histogram distribution lost as a result of the actual trim back in the limit), and if the resultant loss is less than the reference established the limit is again incremented to the next value (358). The actual reference percent loss (Z%) is selectable; since each reduction of the histogram range reduces the intensity of the associated spectral parameter the percent limit is generally small, typically on the order of 0.025%. If instructions 357 indicate that the present trimmed value exceeds the percent limit, instructions 359 cause the CPU to set the trimmed limit to the immediately preceding trim value, such that the percent limit is not exceeded. Instructions 363 perform the same routine for the low limit. Following the establishment of the final limits for a given spectral parameter instructions 364 determine whether or not this is the last channel; if NO instructions 366 increment to the next channel and if YES instructions 368 determine if this is the last CAL COLOR. If not the last color then instructions 370 call up the next color for the limit setting process. Following the completion of the setting of the final limits for the spectral parameters of each of the CAL COLORS, the CPU next execute instructions 372 which compares the new limit spectral parameter data for each color to the new limit spectral parameters for each of the other CAL COLORS. Instructions 374 request the CPU to print out the comparison results (Table I) after which the CPU exits the routine at 376.

As described before the Table I results inform the operator of both the % UNCAL in each of the CAL COLORS in addition to indicating the presence of any interfering colors. If the results indicate acceptable levels of % UNCAL and percent accuracy in the distribution of each color, then the final limits set in the routine of FIG. 8B may be permanently set and the CAL COLOR data read into the RAMs (280–283, FIG. 5) of the color ID circuits. More typically the Table I summary will indicate one or more colors as having unacceptable % UNCAL levels. This may be due to errors on the part of the operator himself in selecting the coordinates of the various areas of the source chart from which the CAL data is obtained, e.g. the coordinate information input by the operator may in reality overlap from one color area into an adjacent color. Alternatively the % UNCAL may be due simply to the type colors used in the source chart. This occurs more frequently with source charts in which pastel colors are used as opposed to vivid colors which are more easily distinguished. In any event it is desirable to reduce the % UNCAL since, as stated before, they represent holes in the recorded data.

Figure 8C:
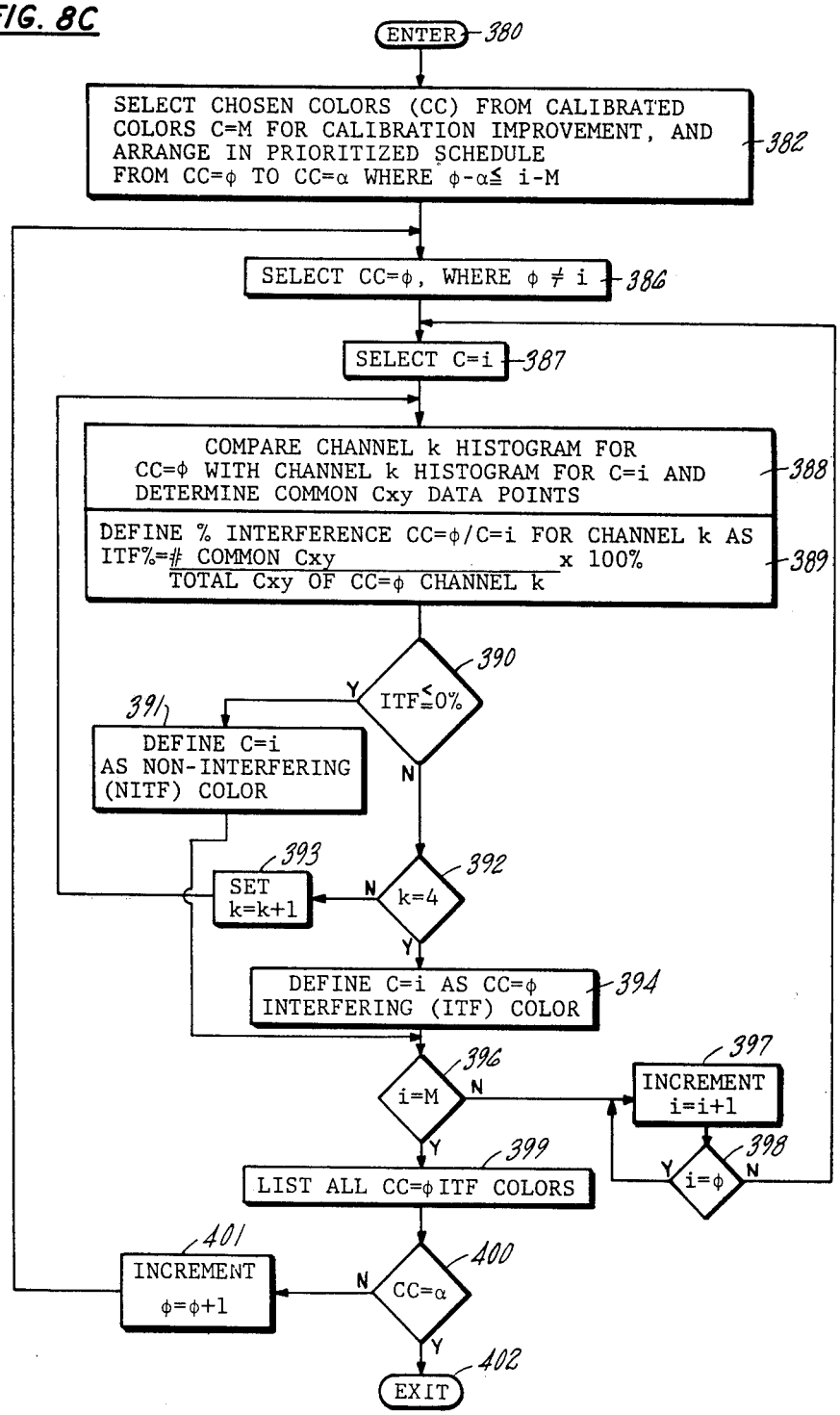
Figure 8D:
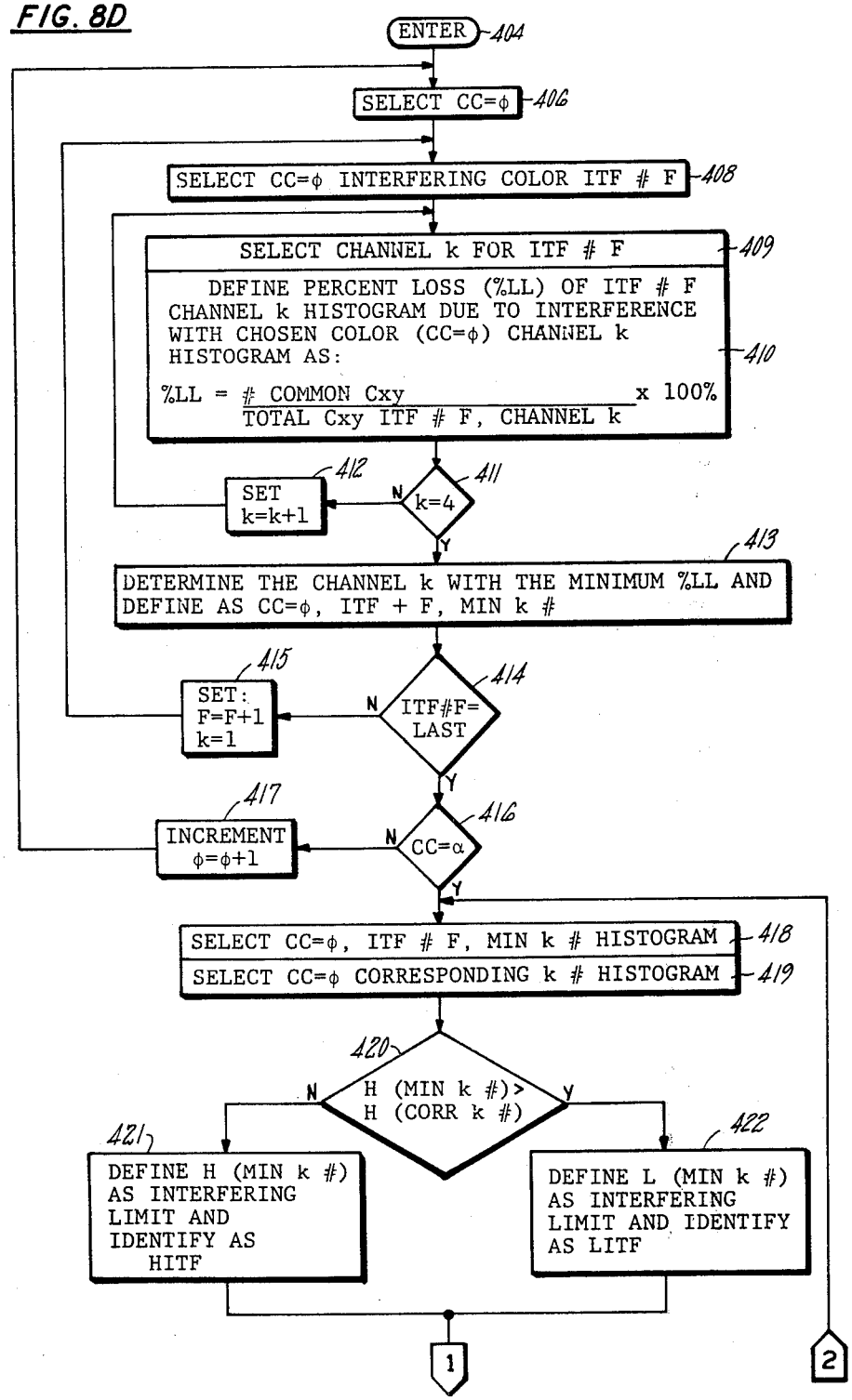
Figure 8E:
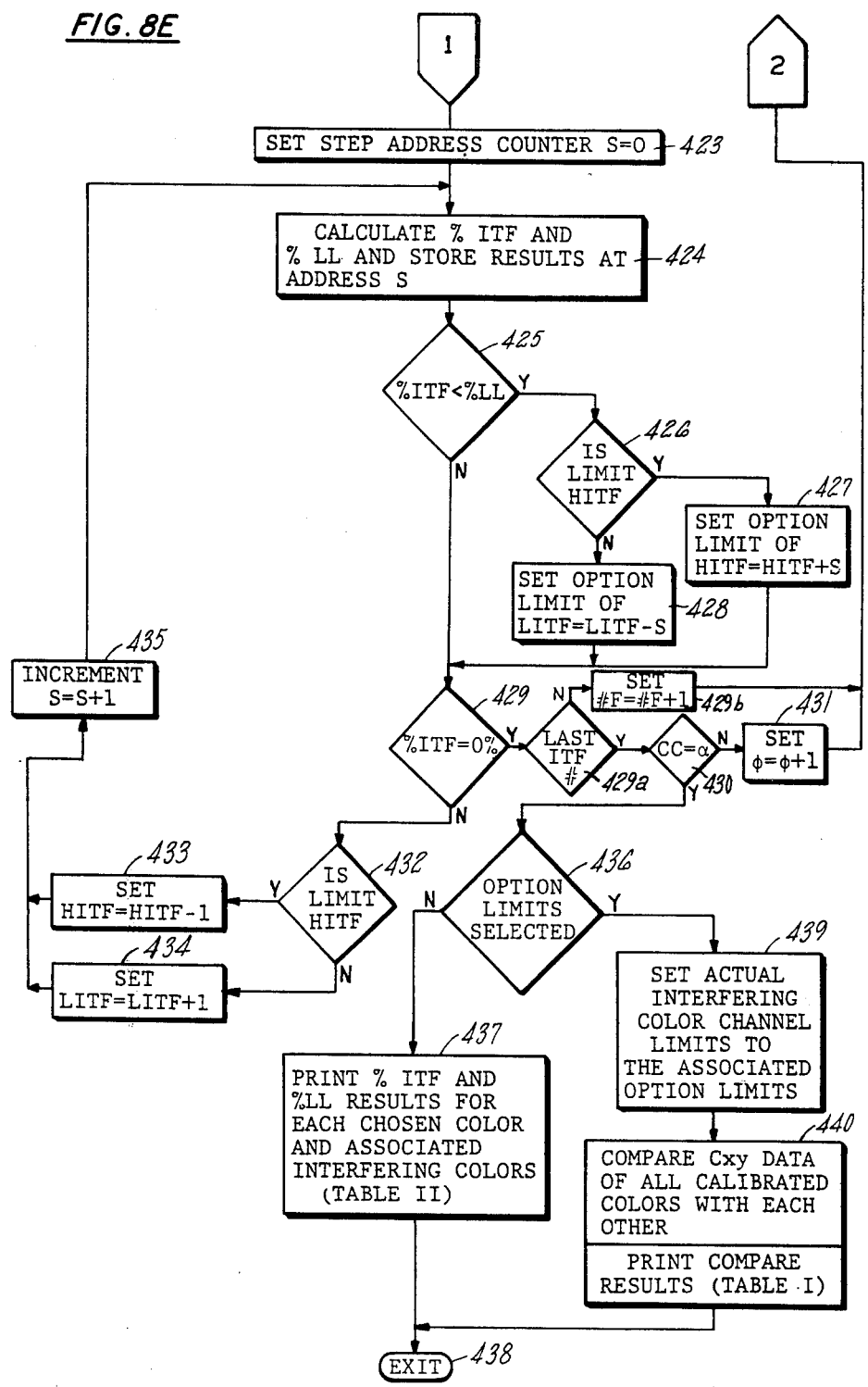

The flowcharts of FIG. 8C–8E illustrate the calibration correction process. Referring to FIG. 8C, the CPU enters at 380 and instructions 382 request the identification of the "chosen colors" (CC), i.e. those of the CAL COLORS of Table I which are to be corrected. Any one or all of the CAL COLORS may be selected and instructions 382 request that those selected be arranged in a prioritized schedule. By establishing a priority status for the colors the operator is assured of preserving the intensity of the more important colors at the sacrifice of the lesser important colors.

With the priority schedule the correction process identifies each of the interfering colors and the particular spectral parameter of each interfering color in which elimination of the overlap will produce the least attenuation. Identification of the interfering colors is provided in instructions 386–401. The first CHOSEN COLOR is selected from the priority table (386) and the first CAL COLOR is selected for comparison (387). The overlap of related spectral parameters are defined as a percentage of interference (ITF%) which is the ratio of the common data points shared by each related parameter divided by the total number of data points in the spectral parameter of the CHOSEN COLOR (388, 389). If the percentage interference is zero (no overlap) in any one of the four spectral parameters (390) then the CAL COLOR is defined as noninterfering (391), otherwise the CPU compares each of the four spectral parameters for each of the CAL COLORS and calculates the ITF% for each (392–398). The interfering colors for each CHOSEN COLOR are listed (399) and the process is repeated for all of the CHOSEN COLORS in the priority table (400, 401). Following the listing of the interfering colors and the ITF% for each, the CPU exits at 402.

Following determination of the percent interference the process next determines the particular one of the interfering spectral parameters which would suffer the least percent loss in eliminating the overlap. The CPU enters the flowchart of FIG. 8D at 404 and instructions 406, 408 identify the first CHOSEN COLOR and select the first interfering color (ITF#F). In instructions 409–412 the CPU calculates the percent loss (%LL) for each of the four spectral parameters of the interfering color; the percent loss being defined as the number of the common data points, i.e. the range of data point overlap, divided by the total number of data points in the interfering color parameter. Instructions 413 determine which of the four channels in each interfering color would have the lowest percent loss for the associated percent interference. Instructions 414–417 repeat the process for each interfering color of each CHOSEN COLOR in the priority schedule.

With the percent interference and the minimum percent loss defined for the spectral parameters of each interfering color the spectral parameters which indicates the minimum percent loss for the percent interference of its CHOSEN COLOR counterpart, is limit corrected in successive iterative steps. Following each correction step the resulting percent interference and percent loss are calculated and stored. The percent loss is compared with the percent interference to determine a crossover point in the values of each, but the correction process continues through successive steps until the actual percent interference is reduced to zero. This is performed by the CPU in instructions 418–435 of flowcharts FIG. 8D, E. With identification of the related interfering spectral parameters (418, 419) the CPU determines which limit of the interfering parameter is overlapping (420–422). Once the interfering limit is identified instructions 423 initiate the limit correction by setting a correction step counter (S) to zero; the step counter keeps a count of the number of corrections performed in reducing the percent interference to zero. Instructions 424 calculates the percent interference and percent loss for the interfering pair of parameters following each correction. Instructions 425–428 represent an option subroutine in which the CPU compares the percent interference to the percent loss to determine a crossover point in the two values, i.e. that point at which the percent loss first exceeds the percent interference (425). When a crossover is detected instructions 426–428 then set "option limit" values for the interfering limit; the value being set at the correction step resulting in crossover. These option limits may be built into the routine to allow for the automatic setting of the correction limits as opposed to the operator selection.

The correction process continues until instructions 429 determine that the percent interference is equal to zero, after which 429a determines if this is the last interfering color for the chosen color and if not then instructions 429b increment to the next interfering color #F. If YES then instructions 430 determine if this is the last CHOSEN COLOR and if NO then instructions 431 increment to the next color in the priority table. In each correction step following a NO to instructions 429 instructions 432–434 set the corrected value for the interfering limit, and instructions 435 then increment to the next correction step value.

Following the calibration correction process for all of the CHOSEN COLORS, instructions 436 determine whether the option limits (425–428) are selected; if NO instructions 437 request the CPU to print out the percent interference and percent loss values calculated in instructions 424 (Table II, described hereinafter) after which the CPU exits at 438. If the option limits are selected the CPU sets the actual interfering color channel limits to the associated option limits determined in instructions 427, 428. In instructions 440 the CPU compares the CAL COLOR data for all colors with the new limits established and prints out the results of this comparison in a new Table I summary, after which the CPU again exists at 438.

The Table II summary printed in instructions 437 is illustrated for one CHOSEN COLOR (color No. 1) together with its two interfering colors (2, N).

TABLE II

COLOR CAL CORRECTION
CHOSEN COLOR - 1

| Step | % ITF | ITF # | % LL |
|------|-------|-------|------|
| 0 | 6.2 | 2 | 0.2 |
| 1 | 2.3 | 2 | 0.2 |
| 2 | 1.2 | 2 | 0.4 |
| 3 | 0.8 | 2 | 0.9 |
| 4 | 0.4 | 2 | 1.2 |
| 5 | 0.0 | 2 | 1.6 |
| 0 | 12.3 | N | 1.1 |
| . | . | . | . |
| . | . | . | . |
| . | . | . | . |

The printout lists by step number the percentages interference and loss between the CHOSEN COLOR and the interfering color. As illustrated for the hypothetical interfering color No. 2 there were five steps in the correction process in reducing the percent interference to zero; step 0 defining the ambient values of interference and loss prior to correction. The results of the option instructions 425–428 would indicate a crossover at step No. 3, at which time the actual limits in the step No. 3 correction would be set for the interfering color No. 2 parameter. The option limits if used, are selectable. Any suitable threshold, or criteria may be established to detect a desired set of correction limits. In any case the process may be performed automatically by the CPU itself. Alternatively where it is deemed necessary to include the operator in the decision making as to the final limits, the CPU prints out the results of the correction process allowing the operator to make the final decision as to the limits to be imposed.

Figure 9:
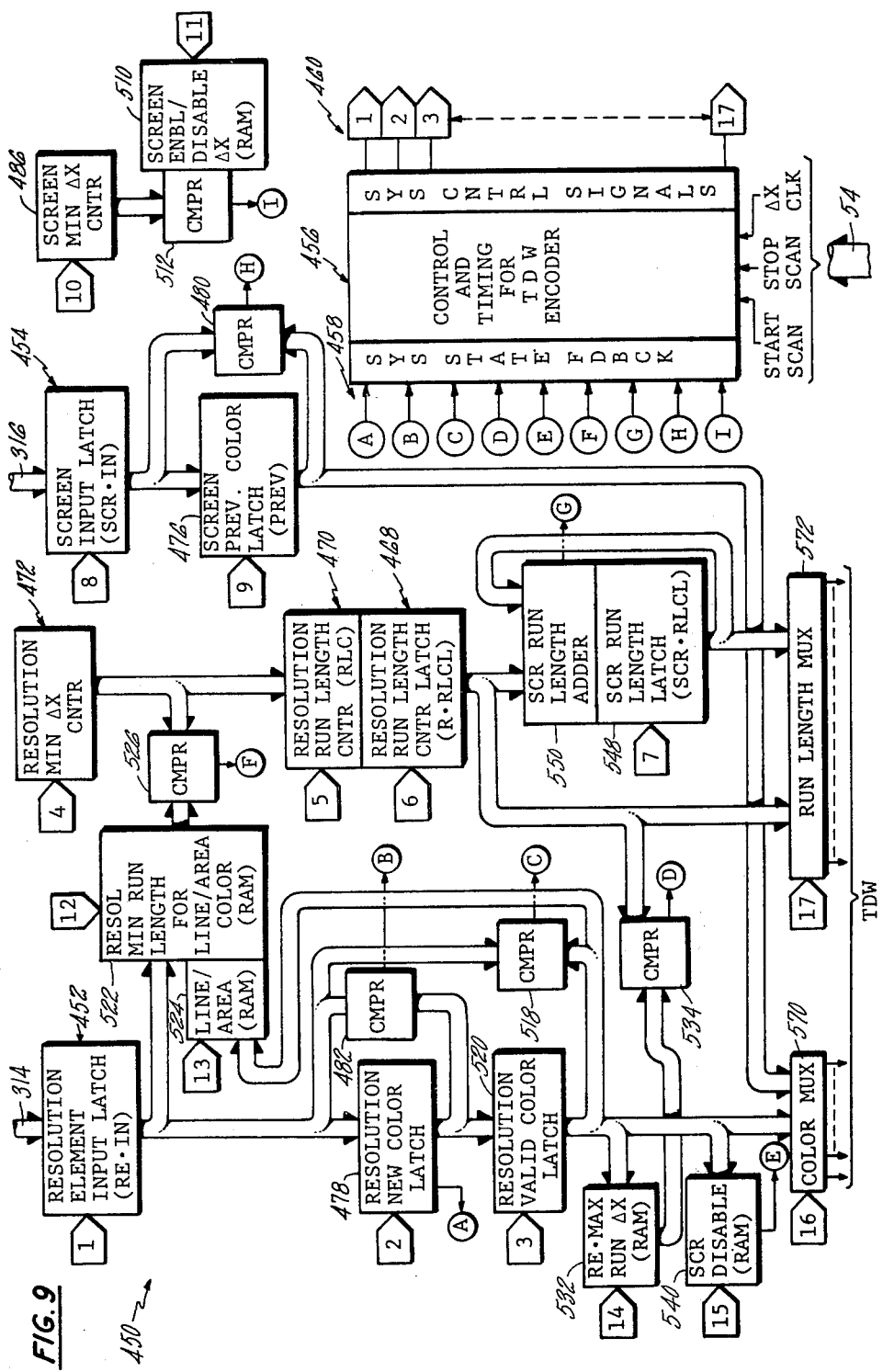
FIG. 9 is a system block diagram illustration of a transition data word encoder for use in the system of FIG. 1, in accordance with the present invention.

The defined color number output signals from the color identification circuits 260, 262 are presented to a transition data word (TDW) encoder, illustrated in FIG. 9. As described hereinafter the TDW encoder converts the two parallel streams of color number information from the resolution and screen aperture channels to a series of run-length coded digital words representing a single raster scan of the chart. The transition data words output by the TDW encoder include information identifying: (1) whether the TDW is a resolution aperture word or a screen aperture word, (2) the resolution or screen color, and (3) a multiple bit count of the number of continuous resolution elements ($\Delta X$) associated with the color ID. The TDW words are output sequentially at a variable frequency related to either a change in the sensed input color information, or status (resolution/screen), or following a max run length bit count as defined by the number of bits in the TDW.

Although run-length coding is a commonly used method of data compression, the raster-type scan of cartographic materials presents two serious problems due to the high resolution accuracy requirements of this type of raster, and also due to the use of screen colors. The resolution accuracy requires the smallest symbology to be recorded and color discriminated, however, the necessity of providing hardware noise filtering to eliminate extraneous noise or other erroneous information normally introduces an attenuation of the resolution accuracy. Similarly, with cartographic screen colors, the dot nature of the screen techniques (color dots on an opposite, or background color field) produce large amounts of color transition data over small resolution element run lengths, i.e. dot to background to dot transitions. This tends to nullify the advantages of the standard run length coding. Referring now to FIG. 9, in a TDW encoder 450 according to the present invention, the color number information from the resolution aperture ID circuit on the line 314 is received by a resolution element input latch (RE.IN) 452; the screen color information from the screen ID circuit on the line 316 is received by a screen input latch (SCR.IN) 454. The input latches and the remaining latches, counters, and look-up table RAMs are under the control of the control and timing circuitry 456 which receives through the lines 54 (FIG. 1) from the system signal processor 36 timing information on the resolution element scan ($\Delta X$ clock) which originates with the 80,000 pulses per drum revolution provided by the shaft encoder (86, FIG. 2); the control and timing circuit also receives the START and STOP scan discrete signals from the processor based on information input to the system by the operator through the console (48, FIG. 1). To simplify the illustration, the encoder state feedback signals 458, i.e. the state of the information as it is processed through the encoder, are shown by the circled letter inputs to the control. The sources of these feedback signals being similarly labeled in the FIG. The output system control signals 460 provided to the latches, MUXs, RAMs, etc. are shown output from the control circuit through the numbered arrowheads.

The TDW encoding provided by the circuit of FIG. 9 is illustrated in the flowchart diagram of FIG. 10. Referring simultaneously to FIGS. 9, 10, following the START enable of the encoder and the first trailing edge of the input clock signal, step 462 latches the color samples provided from the resolution and screen channels on the lines 314, 316. Step 464 determines if the present resolution element sample is a NEW color and if not then step 466 sets a resolution run length counter latch (R.RLCL) 468 to the count value of a resolution run length counter (RLC) 470. The RLC receives the count input from a resolution minimum run length counter 472 which counts the successive clock pulses; the min run length counter being set to zero in the same step. The min run length counter 472 keeps track of the continuous input samples; when it is determined that the succeeding sample is the same as a preceding sample color then the counter may be reset to zero. As described hereinafter the purpose of the min run length count is to allow for some number of the same color samples to occur in a row before a VALID color is assumed to exist.

If the present sample is new then none of the resolution counters are updated at this time; the encoder then executing step 474 to determine if a screen condition has been enabled, i.e. whether or not the encoder is presently set to read input screen color data. If screen is enabled then step 475 determines if this screen color sample is the same as the previous (PREV) sample contained in the PREV color latch 476; the resolution new color latch 478 being used to provide the decision information in step 464. In both steps 464, 475 the actual state condition is provided by comparing the present sample to the prior sample of each channel which is included in the respective latches, through comparators 480 (associated with the latch 476) and comparator 482 (for the latch 478). If the answer to step 475 is YES then step 484 is executed to load in the present screen sample (SCR.IN) into the PREV latch 476, after which the screen minimum run length counter 486 is set to zero in step 488. The steps 484, 488 are also performed following a NO to step 490 which determines if the present and PREV screen color samples are valid screen colors. A YES to step 490, or a NO to step 475 causes the encoder to increment the resolution run length counter (RLC) by one. The RLC always includes an up-to-date, instantaneous count value representative of the actual number of resolution elements received between transitions in input color samples. The RLC being incremented in step 490 after which step 492 increments the minimum run length counter for the resolution and screen inputs and also loads the present resolution color sample into the resolution NEW latch 478. Following step 492 the encoder determines whether or not this is the last element of the scan in step 494, and if YES then executes steps 496-500 to ship out the final TDW to the system processor 36, after which the process is ended.

If the encoder determines that the sample is not the end of scan, then it executes step 502 (FIG. 10B) to again determine if the screen mode is enabled. As evident from FIG. 10B the enablement, or lack of enablement of the screen determines which of the two (left or right) branches the encoder follows. If the screen is enabled (YES) then the right-hand branch is followed with the various screen state conditions to be determined in the sequence of decisions 504-506, each relating to a particular screen status. Alternatively following a NO snwer to step 502 the left-hand branch is followed, which includes a first decision 508 to determine whether or not the screen minimum run length count is greater than the count allowed for the screen enable. In FIG. 9 this information is obtained by comparing the output count from the screen min ΔX counter 486 with that count stored in a look-up table (RAM) in a comparator 512. The RAM table 510 includes two values; a SCREEN ENABLE LENGTH threshold value and a SCREEN DISABLE LENGTH threshold, each value related to some number of resolution elements (RE.IN). Since the presence of screen on the chart is detected with a larger aperture size than that of the resolution aperture, it is possible that combinations of solid color line and area features can produce spectral parameter outputs (from the color ID circuits) which fall within the range of the calibrated screen colors. The ENABLE/DISABLE threshold values provide screen control parameters which are used to minimize the possibility of such solid color features from being lost in the screen aperture area measurement. They also provide the system with a certain amount of immunity to graphic and electronic noise. The table format of the RAM 510 is illustrated in Table III.

TABLE III

| SCREEN (PROCESS COLOR) CONTROL | | |
|---|---|---|
| SCREEN ENABLE LENGTH | 13 | RE . IN |
| SCREEN DISABLE LENGTH | 7 | RE . IN |

The two threshold values are entered by the operator through the console (48, FIG. 1). As a rule the ENABLE and DISABLE length values are equal to one-third and one-sixth the width of the screen aperture (in terms of resolution elements) such that for a resolution aperture of 0.025 mm and a screen aperture of approximately 1.0 mm the values are equal to 13 and 7 resolution elements respectively. In general the ENABLE value is twice that of the DISABLE. The ENABLE assuring that the wide screen aperture is fully over a screen area on the chart before screen transition data words are output. The DISABLE value prevents the system from reverting to resolution (solic color) transition data words if the screen samples produce an uncalibrated screen color or only a few resolution elements.

Referring again to FIG. 10B, following a YES to decision 508 (screen enabled) the encoder executes steps 510-515 which as illustrated in the flowchart ship out a TDW of the resolution color information and count preceding this latest value and set up the various counters for both resolution and screen, to begin the formatting of a next succeeding TDW word of screen data. Instructions 515 actually setting the screen enable flag to the encoder, after which the encoder returns to the first step 462 to latch in the next succeeding color element sample. If decision 508 results in a NO, such that the screen is not enabled then decision 516 determines if this sample is a VALID resolution color. In FIG. 9 this is provided by comparator 518 which compares the color stored in the resolution VALID color latch 520 with the present color value stored in the input latch 452. The VALID latch is loaded from the NEW latch 478 only after some minimum number of run length counts (min ΔX) from the counter 472. The minimum count number is further dependent on whether the input color has been defined by the operator as either a LINE or an AREA color in the calibration process described hereinbefore. Since LINE colors denote boundaries, hazards, etc. requiring high resolution detection, their presence must be detected with a minimum number of samples. This in contrast to AREA colors which in a solid color source chart (no screen format) are used as fill colors between the LINE (symbol) colors; for the AREA colors a larger minimum count is used. This LINE/AREA feature is part of the hardware filtering provided by the TDW encoder, and is designed so that invalid color spans and voids in a solid color chart are eliminated from the raster scanner output data without degrading the quality of the encoded line, or symbol features which appear on the chart. In FIG. 9 the minimum run lengths for the LINE/AREA colors are loaded into a look-up table RAM 522 in a format typified by Table IV.

TABLE IV

LINE/AREA MINIMUM RUN LENGTH (MIN ΔX)

| COLOR NO. | GROUP AS LINE OR AREA (L/A) | MIN ΔX FOLLOWING A LINE COLOR | MIN ΔX FOLLOWING A AREA COLOR |
|---|---|---|---|
| 1 | L | 1 | 3 |
| 2 | A | 1 | 3 |
| 3 | L | 1 | 1 |
| 4 | A | 1 | 3 |
| 5 | A | 1 | 3 |
| . | . | . | . |
| . | . | . | . |
| . | . | . | . |

As shown in Table IV, each of the color numbers listed is identified as either a LINE (L) or AREA (A). The third column defines the minimum number of resolution elements required to validate (RE.IN=VALID) any color when it follows a LINE color. Column 4 lists the minimum resolution element count to validate a color when it follows an AREA color. In other words colors No. 1 and 2 define respectively as a LINE and AREA color each have a minimum count of one when they appear following a preceding LINE color. One count of color No. 2 when it appears following a LINE color will validate this color to ensure that the preceding LINE color edge is not altered. Alternatively for a color No. 2 sample following another AREA color a minimum of three samples is required to immunize the data against noise. This filtering being allowed since the previous color is not a critical line boundary, or symbol color. The LINE/AREA RAM 524 (FIG. 9) defines to the min run length RAM 522 which type of color is presently loaded in the VALID latch. The RAM 522 receives the present sample from the input latch 452 and provides the minimum run length value for that color based on the VALID color in the latch 520 with the actual count provided from counter 472; the comparison being made by comparator 526.

If the sample is VALID following decision 516, step 528 loads the run length count output into the latched run length count and resets the minimum run length counter to zero. Following step 528, or a NO to decision 516, the encoder next determines in decision 530 whether or not the present minimum resolution element count is greater than the maximum count permitted in a single TDW. In FIG. 9 this is provided by the max count value RAM 532 whose output is compared through comparator 534 with the output from the R.RLCL 468. If NO then the encoder returns to START. If YES then the encoder next executes steps 536-539 to output a TDW representing the present VALID resolution color and its element count, as clearly illustrated in the flowchart, after which the encoder again returns to the START location.

The right-hand branch of the flowchart (10B) relates to altering a present screen mode of operation. In addition to the ENABLE/DISABLE screen threshold function performed in the RAM 510 a further screen disable function may be included as a precaution against accepting as valid screen data what is in reality resolution data. This second set of run length parameters, labeled max resolution color run length limits are loaded in yet another look-up table RAM 540 in the format typified by TABLE V.

TABLE V

| | (SCREEN DISABLE) MAX (RE . IN) COLOR RUN LENGTH | |
|---|---|---|
| COLOR NO. | ENABLE (E)/DISABLE (D) | RE MAX ΔX |
| 1 | D | — |
| 2 | E | 2 |
| 3 | E | 7 |
| 4 | E | 2 |
| 5 | E | 2 |
| . | . | . |
| . | . | . |

As shown the run length values are selectable to provide either an enable or disable of the screen. Each limit is set so that when a run length of resolution color is detected, whether a screen color or not, but the run length exceeds the screen dot (or line) width, the TDW encoder reverts to outputting resolution color TDW regardless of the state of the screen ID output. Comparing the limits established in Tables III, V, the screen aperture must detect the presence of screen color for thirteen resolution elements (ENABLE, Table III) before the TDW control begins formatting screen data words. Seven resolution elements with no calibrated screen (DISABLE, Table III) must be present before the TDW reverts to resolution color control. In addition (Table V) two resolution elements of color Nos. 2, 4, or 5 cause the TDW to revert to resolution color control regardless of the presence of valid screen data. Color No. 3 which is assumed to be a screen color (dot width 5) must be present for a run-length of seven before the TDW reverts to outputting resolution color data. The limits of Table V, as with Table III are selectable by the operator and entered during the calibration process. The actual limits being determined by the particular source chart color content, symbology etc.

Figure 10B:
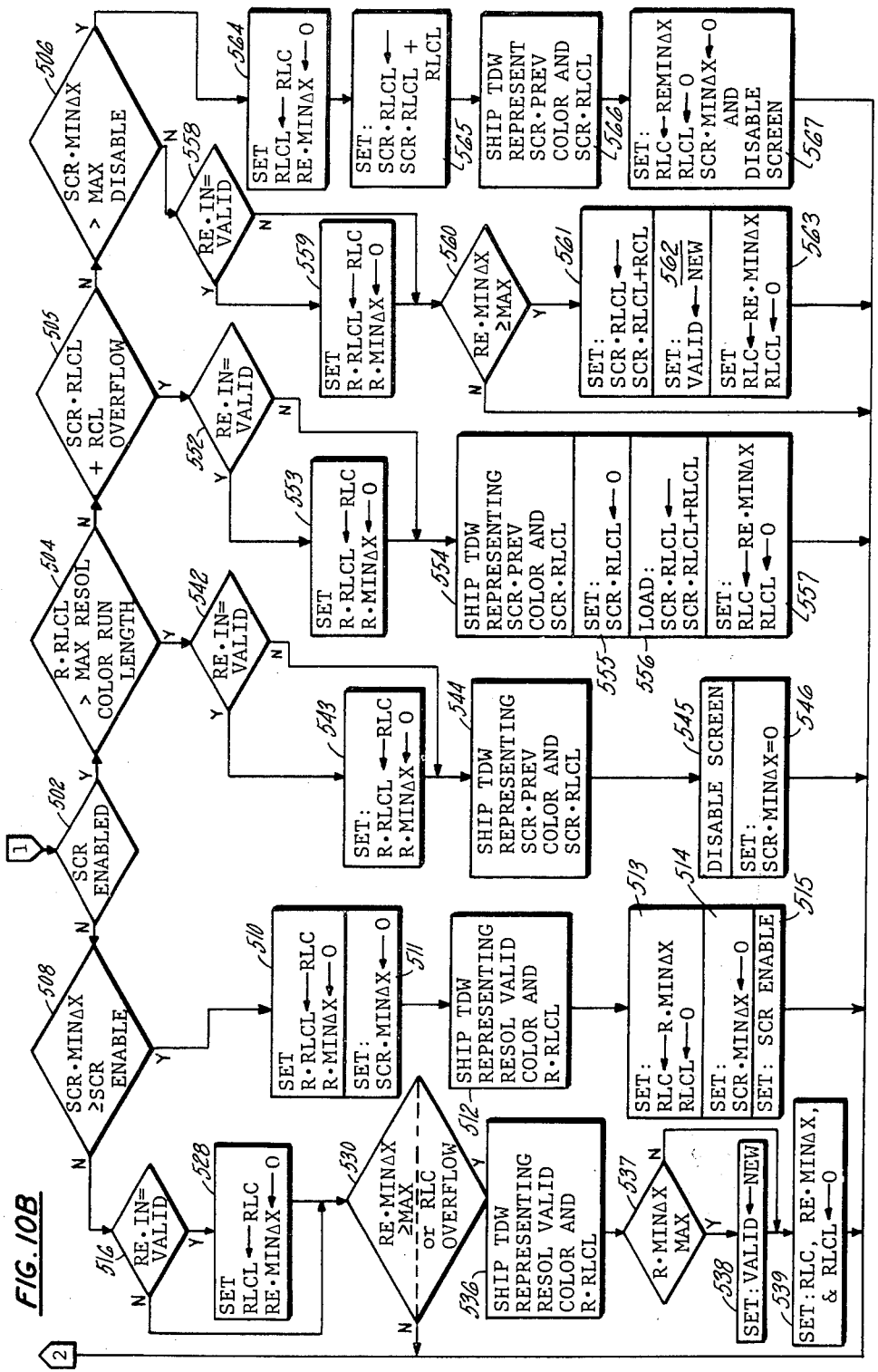
FIG. 10 (comprised of 10A and 10B) is a flowchart diagram illustration of the function of the system of FIG. 9.

Decision 504 in FIG. 10B implements this screen disable function, and if the max resolution color run length is exceeded the encoder executes steps 542-546 to convert from screen to resolution mode formatting, after which it branches back to the START. If there is a NO to decision 504 decision 505 determines whether or not there is a present overflow in the sum count stored in the screen run length counter latch (SCR.RLCL) 548 (FIG. 9) which is provided to the counter latch from a screen run length adder 550. If YES then the encoder executes steps 552-557 to ship out a TDW with the present screen color (PREV) and color count; the encoder again returning to the START. Finally decision 506 determines whether the present minimum run length count in counter 486 is greater than the max DISABLE threshold of RAM 510, as described hereinbefore. If NO then steps 558-563 load the screen counter latch 548 with the contents of the resolution run length counter, set the NEW color element into the VALID latch and reset the resolution run length counter latch to zero; after which the encoder returns to the START position. If a YES to decision 506, such that screen is disabled, instructions 564-567 shift the encoder to resolution color control and ship out a TDW representative of the present screen color and count. The screen disable flag being set and the encoder again returning to the START position.

The output from the TDW encoder is provided through the output MUXs, including the smaller bit color MUX 570 and the run length MUX 572. The TDW data is provided to the system signal processor (36, FIG. 1) and is loaded on tape storage through the magnetic tape drive 44.

Figure 11:
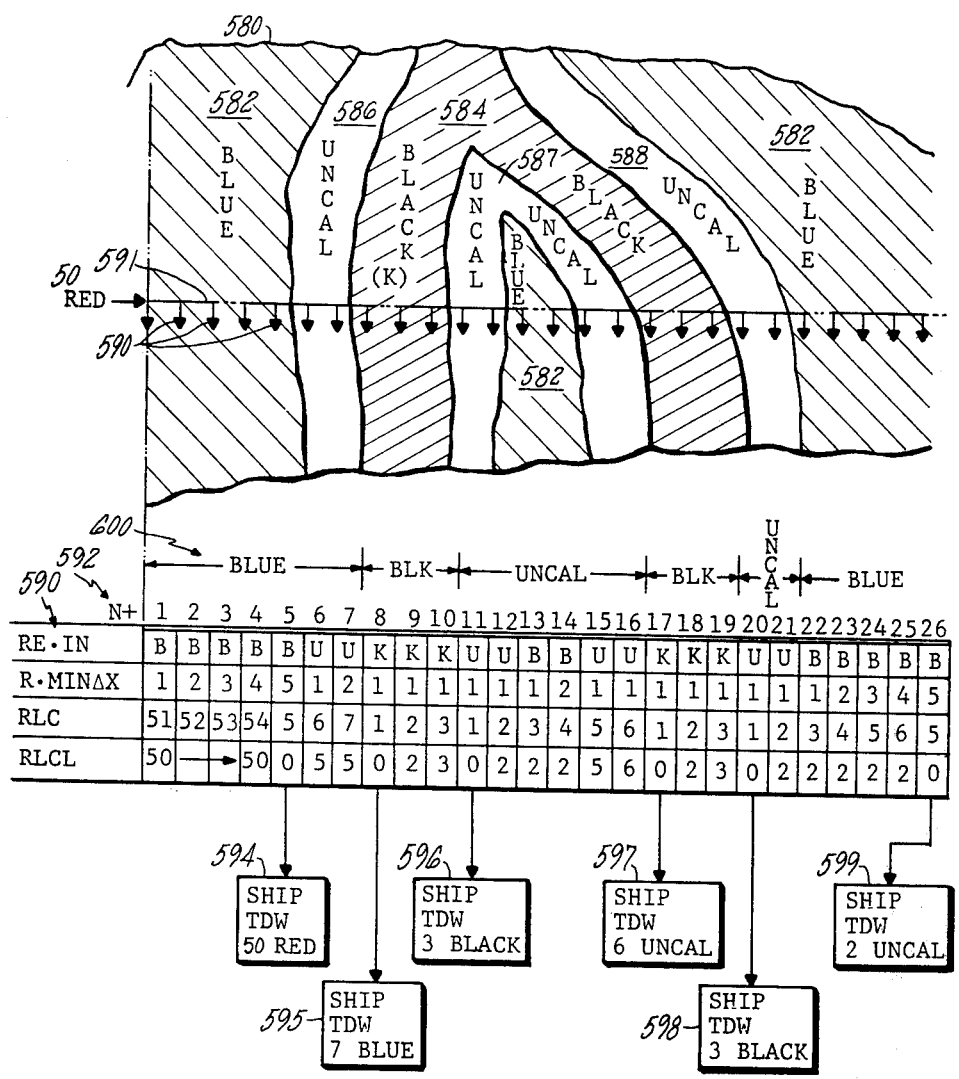
FIG. 11 is a combined illustration and tabulation of one function performed by the system of FIG. 9.
Figure 12:
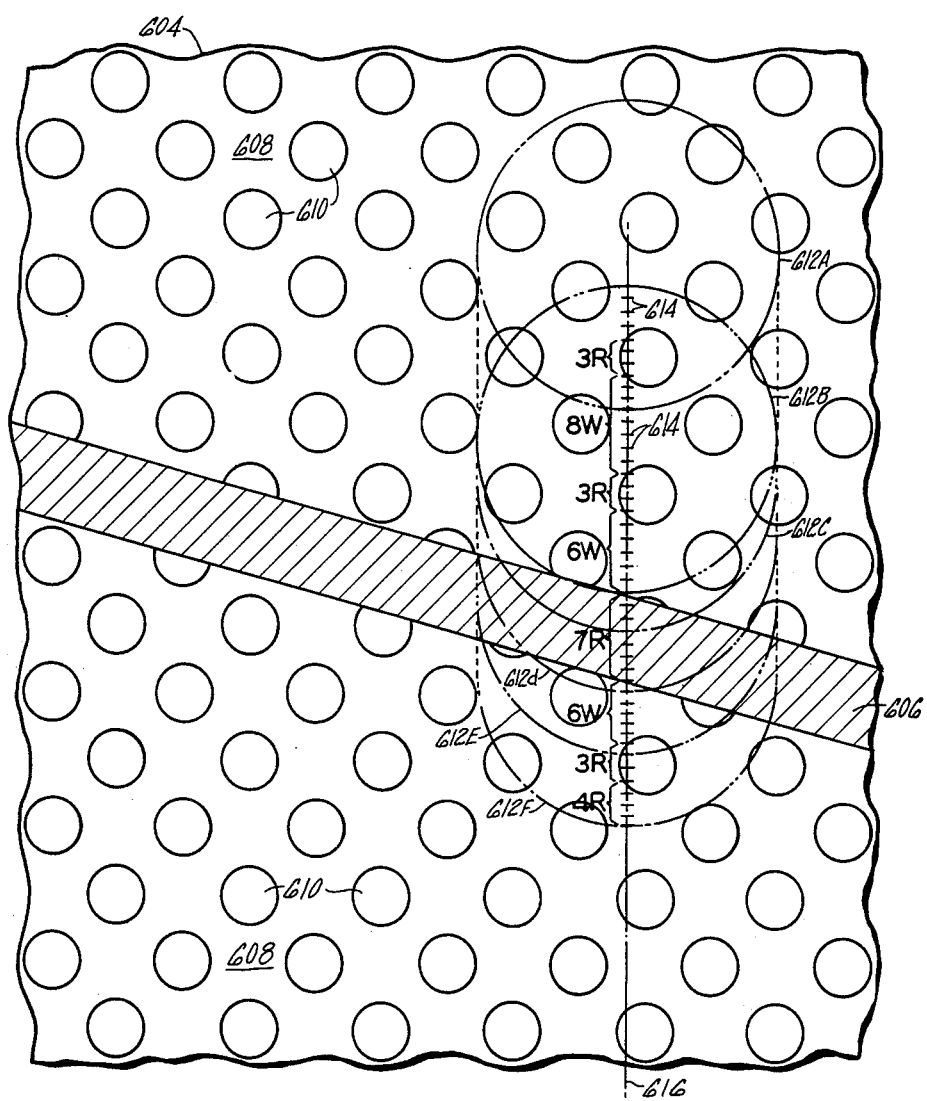
FIG. 12 is an illustration of another function performed by the system of FIG. 9.

FIGS. 11-12 illustrate the various functions performed by the TDW encoder in compacting the resolution and screen aperture data into the TDW format which is then output to the system processor. In FIG. 11 a chart sample 580, assumed to be a solid color chart, includes solid color blue areas combined with solid color black boundary lines 582, 584. Also illustrated in the chart sample is the uncalibrated (UNCAL) areas 586-588. These UNCAL regions result from the scattering of the light from the illuminator (68, FIG. 2, FIG. 3) on the source chart surface. This results in the inability to define a unique color; in FIG. 11 the UNCAL being a blend of the black and blue colors which is not recognized by the color ID. To preserve the LINE color width, which is essential, the TDW encoder provides a hardware filtering of the data samples 590 illustrated along the scan line 591 (shown in phantom) and listed in the tabulation of 592 which also illustrates the signal state of the resolution element counters of the encoder in response to the input data samples. It is assumed that the first sample (N+1) follows fifty samples of a resolution RED color such that the RLCL count is indicated as 50 at the beginning of the tabulation. This hardware filtering by the encoder is provided through the LINE/AREA minimum run length function (Table IV, decision 516 etc.) to provide the TDW output words 594-599 in response. As evident by comparing the sample elements along the scan line 591 with the equivalent color output 600 provided by the TDW, the line width of the black area 584 is preserved. There is no degradation in the line edges. The output TDW of six UNCAL samples (N+11—N+16) may be later corrected in a post-editing process in which these UNCAL points are filled in with the adjacent blue AREA color.

Figure 13B:
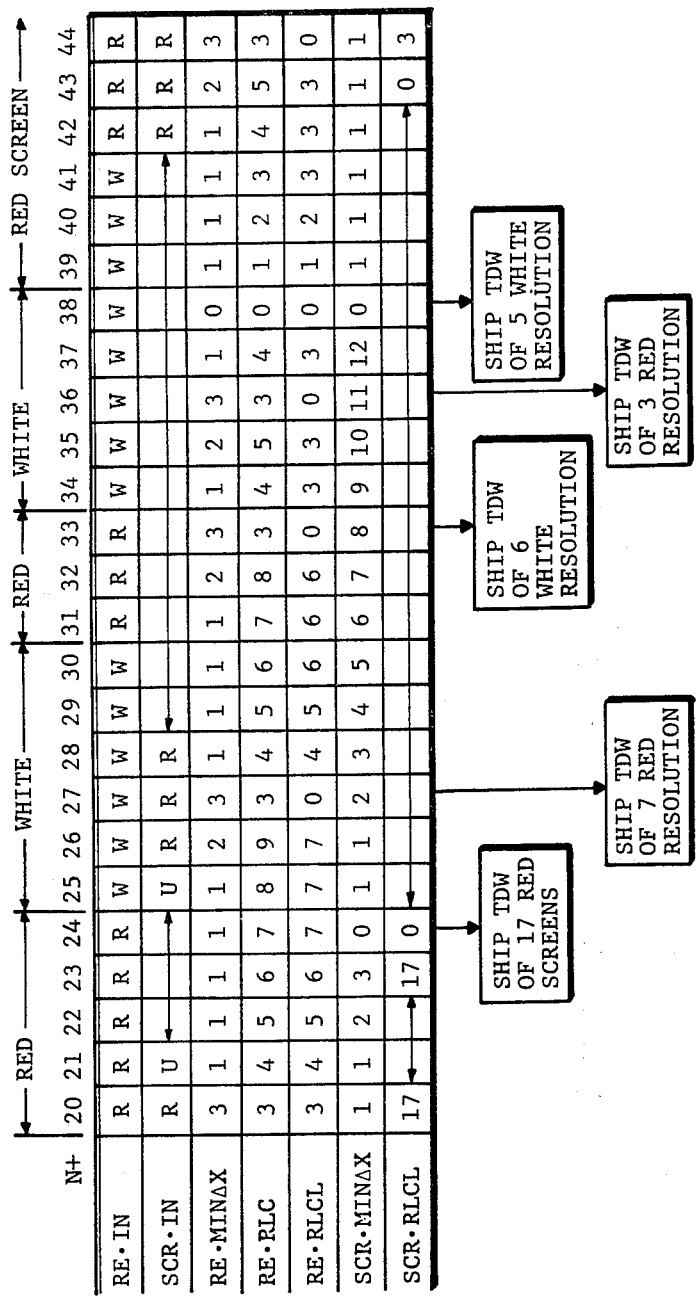
FIG. 13 (comprised of 13A and 13B) is a tabulation of the results of the function illustrated in FIG. 12.

FIG. 12 illustrates a chart sample 604 in which a solid color line 606 is disposed on a color screen area 608. The screen dots 610 are assumed to be the same color (RED) as the line 606; both screen dots and line being superimposed on a WHITE background. The outline of the screen aperture 612 is illustrated as it scans across the screen 608 and impinges on the line 606 (612A-612C) for the resolution elements 614. The screen aperture outlines illustrated as 612D-612-F demonstrate the scan as it transitions from the line 606 back to the screen color. The screen aperture outline and resolution elements being illustrated as taken along a scan line 616. The disable of the screen mode for the data samples taken along the successive screen aperture increments (612A-612C) is tabulated in FIG. 13A, which illustrates the state of the encoder resolution screen counters. Similarly the enable of the screen mode for the screen aperture increments 612D-612F are tabulated in FIG. 13B. The screen ENABLE/DISABLE being provided according to the flowchart illustrations of FIGS. 10A, 10B as described hereinbefore.

The color raster scanner provides accurate color discrimination and resolution for use in reproduction of cartographic source material. The use of the dual aperture in small size resolution and large area screen allows for accurate color discrimination for screen (process color) source charts while maintaining the resolution accuracy requirements for detecting the smallest size chart symbology. The color identification circuits allow for fast, accurate identification of the sampled chart color through the use of the color sample spectral parameter magnitudes as the direct address to each of the four color RAMs; the ID color encoder defining a unique color number or providing an UNCAL signal manifestation in the absence of color. This as opposed to allowing mistaken color identification. Similarly the color calibration process minimizes the occurrence of the UNCAL condition through the use of both limit settings and also a post CAL COLOR data acquisition enhancement method, which provides for the balance between the number of UNCAL and the loss of CAL COLOR intensity. Finally the run length encoding format provided by the TDW encoder provides not only data compacting by outputting a multiple bit TDW for sampled color content between color transitions. The TDW encoder providing for both hardware filtering without loss of resolution accuracy, while still maintaining the ability to discriminate between screen color and resolution color in those charts containing screen formatting.

Although the present invention has been described with respect to a best mode embodiment thereof, it should be understood by those skilled in the art that the foregoing and various other changes, omissions and additions in the form and detail thereof may be made therein without departing from the spirit and the scope of this invention.

We claim:

1. A run-length encoder circuit for encoding in successive digital words the color and the continuous sample number run length for a common color from color sampled data received from a color raster scanner having two optical apertures including a small diameter resolution aperture and a large diameter screen aperture, the run-length encoder comprising:
    means for registering color samples received successively from each of the two apertures, separately;
    means for counting successive samples from each aperture having the same identified color;
    memory means for storing signals representative of sets of count values, one set for each different color represented by the input samples, said sets of count values being selectable in dependence on the status of the sampled color as being alternatively a line color, or an area color; and
    means for comparing the count of samples from the resolution aperture having a common color to the set of count values associated with that color and for providing in response to the actual count being greater than the selected count, providing an output digital word including the color identification and the actual run length sample count associated with the identified color.

2. A run-length encoder for encoding in successive digital words, the color and the continuous sample number run length for color sample data received from a color raster scanner having two optical apertures including a small diameter resolution aperture for recording resolute detail symbology and a large diameter screen aperture for recording screen color symbology from a cartographic source chart, comprising:

means for registering color samples received successively from each of the two apertures, separately;

means for counting common color successive samples from each aperture;

memory means for storing signals representative of sets of count values, including sets of resolution aperture count values and sets of screen aperture count values, each of said sets of count values being associated with a different one of the resident colors on the source chart, said resolution sets of count values being selectable in dependence on the resolution sampled color as being alternatively a line color, or an area color; and means for comparing the count samples from the resolution aperture for providing in response to an actual run length count value for a common continuously received screen color being greater than the set of count values associated with that screen color, the recording of the color samples from said screen aperture in successive digital words representative of the screen color received and the run length count, said run-length encoder recording the resolution color samples at all other times.

* * * * *

UNITED STATES PATENT AND TRADEMARK OFFICE
CERTIFICATE OF CORRECTION

PATENT NO. : 4,301,469
DATED : November 17, 1981
INVENTOR(S) : Douglas P. Modeen & Frank D. Sundermeyer It is certified that error appears in the above—identified patent and that said Letters Patent is hereby corrected as shown below:

Column 7, line 15 "increment" should be --incremented--.

Column 7, line 40 after "aperture" insert --spectral--.

Column 17, line 22, change "363" to --360-363--.

Signed and Sealed this

Twenty-fourth Day of August 1982

[SEAL]

Attest:

GERALD J. MOSSINGHOFF

*Attesting Officer*  *Commissioner of Patents and Trademarks*